United States Patent
Masuda et al.

(10) Patent No.: US 11,228,711 B2
(45) Date of Patent: Jan. 18, 2022

(54) SHAKE CORRECTION CONTROL DEVICE, IMAGING APPARATUS, SHAKE CORRECTION METHOD OF IMAGING APPARATUS, AND PROGRAM

(71) Applicant: FUJIFILM Corporation, Tokyo (JP)

(72) Inventors: Tomonori Masuda, Saitama (JP); Masahiko Sugimoto, Saitama (JP); Yi Pan, Saitama (JP); Takashi Hashimoto, Saitama (JP); Tetsuya Fujikawa, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/329,193

(22) Filed: May 25, 2021

(65) Prior Publication Data

US 2021/0281758 A1    Sep. 9, 2021

Related U.S. Application Data

(63) Continuation of application No. PCT/JP2019/046554, filed on Nov. 28, 2019.

(51) Int. Cl.
*H04N 5/232* (2006.01)

(52) U.S. Cl.
CPC ..... *H04N 5/23267* (2013.01); *H04N 5/23287* (2013.01)

(58) Field of Classification Search
None
See application file for complete search history.

(56) References Cited

U.S. PATENT DOCUMENTS

2001/0022619 A1*  9/2001 Nishiwaki .......... H04N 5/23267
                                                      348/208.99
2006/0087562 A1*  4/2006 Nakanishi .......... H04N 5/23296
                                                      348/208.12
(Continued)

FOREIGN PATENT DOCUMENTS

JP    2006304259    11/2006
JP    2010074378    4/2010
(Continued)

OTHER PUBLICATIONS

"International Search Report (Form PCT/ISA/210) of PCT/JP2019/046554," dated Jan. 28, 2020, with English translation thereof, pp. 1-5.
(Continued)

*Primary Examiner* — Cynthia Segura
(74) *Attorney, Agent, or Firm* — JCIPRNET

(57) ABSTRACT

A shake correction control device includes an acquisition unit that acquires imaging information for selecting mechanical correction of mechanically performing shake correction of a subject image or electronic correction of electronically performing the shake correction of the subject image, and a shake correction control unit. The shake correction control unit performs a first control for performing a switching control from the mechanical correction to the electronic correction by synchronizing shake correction operations of the mechanical correction and the electronic correction and a second control, different from the first control, for performing a switching control from the electronic correction to the mechanical correction based on the imaging information acquired by the acquisition unit.

19 Claims, 13 Drawing Sheets

(56) References Cited

U.S. PATENT DOCUMENTS

| | | |
|---|---|---|
| 2006/0216009 A1 | 9/2006 | Kawamura |
| 2007/0291114 A1* | 12/2007 | Oshima .............. H04N 5/23248 |
| | | 348/126 |
| 2009/0009617 A1* | 1/2009 | Ito .......................... H04N 5/361 |
| | | 348/222.1 |
| 2009/0225176 A1* | 9/2009 | Honjo .................. G02B 27/646 |
| | | 348/208.99 |
| 2009/0316010 A1* | 12/2009 | Nomura ............. H04N 5/23258 |
| | | 348/208.6 |
| 2012/0293672 A1* | 11/2012 | Nonaka .................... G03B 5/00 |
| | | 348/208.5 |
| 2013/0155262 A1* | 6/2013 | Katoh ................ H04N 5/23283 |
| | | 348/208.5 |
| 2016/0182828 A1 | 6/2016 | Ikeda |
| 2017/0078577 A1 | 3/2017 | Wakamatsu |
| 2018/0054558 A1* | 2/2018 | Nakata ..................... G03B 7/26 |
| 2019/0052810 A1* | 2/2019 | Tsubaki ............. H04N 5/23258 |

FOREIGN PATENT DOCUMENTS

| | | |
|---|---|---|
| JP | 2013126075 | 6/2013 |
| JP | 2016024235 | 2/2016 |
| JP | 2016118701 | 6/2016 |
| JP | 2017058660 | 3/2017 |

OTHER PUBLICATIONS

"Written Opinion of the International Searching Authority (Form PCT/ISA/237) of PCT/JP2019/046554," dated Jan. 28, 2020, with English translation thereof, pp. 1-10.

"International Preliminary Report On Patentability (Form PCT/IPEA/409) of PCT/JP2019/046554," completed on Jul. 17, 2020, with English translation thereof, pp. 1-23.

* cited by examiner (PATTERN EXAMPLE 1)

(PATTERN EXAMPLE 2)

(PATTERN EXAMPLE 3)

(PATTERN EXAMPLE 4)

(PATTERN EXAMPLE 1)

(PATTERN EXAMPLE 2)

(PATTERN EXAMPLE 3)

(RESIDUAL SHAKE IN PATTERN EXAMPLE 3)

SHAKE CORRECTION CONTROL DEVICE, IMAGING APPARATUS, SHAKE CORRECTION METHOD OF IMAGING APPARATUS, AND PROGRAM

CROSS-REFERENCE TO RELATED APPLICATIONS

This application is a continuation application of International Application No. PCT/JP2019/046554, filed Nov. 28, 2019, the disclosure of which is incorporated herein by reference in its entirety. Further, this application claims priority under 35 USC 119 from Japanese Patent Application No. 2018-224227 filed Nov. 29, 2018, the disclosure of which is incorporated by reference herein.

BACKGROUND

1. Technical Field

The technology of the present disclosure relates to a shake correction control device, an imaging apparatus, a shake correction method of an imaging apparatus, and a program.

2. Related Art

An imaging apparatus generally has a shake correction function of correcting a shake of an image. The shake correction function includes mechanical correction of mechanically correcting the shake and electronic correction of electronically correcting the shake.

For example, the mechanical correction is a method of correcting the shake of the image by detecting trembling of the imaging apparatus and suppressing movement of an image formation optical axis of a subject by moving a shake correction lens. A method of correction by moving a position of an imaging element in a direction of the image formation optical axis of the subject moved by a camera shake or the like is also one type of mechanical correction.

For example, the electronic correction is a method of correcting the shake by moving a part that is cut out from an image recorded by the imaging element and is displayed, in accordance with a direction of the subject moved by the camera shake or the like.

Each of the mechanical correction and the electronic correction has advantages and disadvantages. In the mechanical correction, shake correction is performed even during an exposure time period. Thus, shake correction performance is high. However, since it is necessary to physically move the correction lens and/or the imaging element, an amount of energy consumption for driving is large. Thus, it is necessary to frequently perform charging in a rechargeable imaging apparatus. In addition, in a case where a physical driving unit is frequently used, a mechanical lifetime may be decreased due to deterioration.

Meanwhile, in the electronic correction, the shake correction is performed by only electronic image processing, and the correction lens and/or the imaging element is not physically moved. Thus, power consumption is small, and it is not necessary to consider the mechanical lifetime. However, since the electronic correction is a method of correcting the shake based on the recorded image, the shake within an exposure time period of one frame cannot be corrected. Thus, the electronic correction has lower shake correction performance than the mechanical correction. Therefore, combining two methods is considered.

For example, considering features of two types of correction methods, JP2013-126075A discloses an imaging apparatus that performs appropriate image shake correction while producing the advantages of each method, by switching to optical correction (mechanical correction) or electronic correction and furthermore, using both of the optical correction and the electronic correction by changing a ratio therebetween based on at least one of a shutter speed or an image shake amount in a case of imaging.

JP2016-024235A discloses an imaging apparatus that optically (mechanically) corrects high-frequency components of a correction amount for correcting an image shake caused by a motion of the apparatus, and electronically corrects the image shake based on a correction amount obtained from a difference between the correction amount and a position of a mechanical element used for optical correction. This configuration enables implementation of a favorable correction effect with suppression of an effect of disturbance.

SUMMARY

From the features of the mechanical correction and the electronic correction, it is preferable to prioritize the electronic correction and not use the mechanical correction as much as possible from a viewpoint of the mechanical lifetime and a power consumption amount. Therefore, in the imaging apparatus, for example, it is considered that a threshold value of the exposure time period is set, and that the mechanical correction and the electronic correction are switched depending on whether the threshold value is exceeded or not reached. However, in a case of this switching, a shake that is corrected before switching is not corrected due to a difference in correction performance between the mechanical correction and the electronic correction. Thus, the shake of the image is rapidly increased, and a user may feel awkward.

One embodiment of the present disclosure provides a shake correction control device, an imaging apparatus, a shake correction method of an imaging apparatus, and a program capable of using both of mechanical correction and electronic correction and reducing awkwardness in a case of switching between the mechanical correction and the electronic correction.

A shake correction control device according to a first aspect comprises an acquisition unit that acquires imaging information for selecting mechanical correction of mechanically performing shake correction of a subject image or electronic correction of electronically performing the shake correction of the subject image, and a shake correction control unit that performs a first control for performing a switching control from the mechanical correction to the electronic correction by synchronizing shake correction operations of the mechanical correction and the electronic correction and a second control for performing a switching control from the electronic correction to the mechanical correction based on the imaging information acquired by the acquisition unit, the shake correction control unit performing different controls between the first control and the second control.

By this configuration, both of the mechanical correction and the electronic correction can be used, and a feeling of awkwardness in a case of switching between the mechanical correction and the electronic correction can be reduced.

In the shake correction control device according to a second aspect, the shake correction control unit performs controls of different time responsiveness between the first control and the second control.

In the shake correction control device according to a third aspect, the shake correction control unit performs a control for differently setting a length of a time period of the first control and a length of a time period of the second control.

In the shake correction control device according to a fourth aspect, the shake correction control unit sets the length of the time period of the first control to be longer than the length of the time period of the second control.

In the shake correction control device according to a fifth aspect, the shake correction control unit, in the first control, decreases a first operation ratio with an elapse of time and increases a second operation ratio with the elapse of time from a start to an end of the first control, the first operation ratio being a ratio of a shake correction amount of the mechanical correction to a correction amount necessary for the shake correction, and the second operation ratio being a ratio of a shake correction amount of the electronic correction to the correction amount necessary for the shake correction.

In the shake correction control device according to a sixth aspect, the shake correction control unit, in the second control, increases the first operation ratio with the elapse of time and decreases the second operation ratio with the elapse of time by synchronizing the shake correction operations of the mechanical correction and the electronic correction, from a start to an end of the second control.

In the shake correction control device according to a seventh aspect, the shake correction control unit, in the second control, performs the switching control from the electronic correction to the mechanical correction without synchronizing the shake correction operations.

By this configuration, switching can be immediately performed to the mechanical correction in a case of prioritizing the shake correction.

In the shake correction control device according to an eighth aspect, the shake correction control unit, before a start of the first control, performs a third control for setting a correction amount of the mechanical correction to be less than a correction amount necessary for the shake correction.

By this configuration, the feeling of awkwardness in a case of switching from the mechanical correction to the electronic correction can be further suppressed.

In the shake correction control device according to a ninth aspect, a length of a time period of the first control is variable.

By this configuration, options for a user can be widened.

The shake correction control device according to a tenth aspect further comprises a detection unit that detects a predetermined target, in which the shake correction control unit, in the first control, set a length of a time period of the first control in a case of not detecting the target to be shorter than in a case of detecting the target.

By this configuration, any of suppression of the feeling of awkwardness and reduction of an amount of power consumption can be prioritized depending on whether or not the predetermined target is detected.

In the shake correction control device according to an eleventh aspect, the shake correction control unit, in a case where a predetermined condition is established, performs a control for switching from the mechanical correction to the electronic correction without synchronizing the shake correction operations and switching from the electronic correction to the mechanical correction without synchronizing the shake correction operations.

By this configuration, non-execution of both of the first control and the second control can be selected depending on whether or not the predetermined condition is established.

In the shake correction control device according to a twelfth aspect, a mechanical correction unit performs the shake correction of the subject image by moving a correction optical system.

An imaging apparatus according to a thirteenth aspect comprises the shake correction control device according to any one of the first aspect to the twelfth aspect.

The imaging apparatus according to a fourteenth aspect is a monitoring camera.

A shake correction method of an imaging apparatus according to a fifteenth aspect comprises a first step of performing a switching control from mechanical correction of mechanically performing shake correction of a subject image to electronic correction of electronically performing the shake correction of the subject image, by synchronizing operations of the mechanical correction and the electronic correction, and a second step of performing a switching control from the electronic correction to the mechanical correction by a switching control different from the switching control in the first step.

A program according to a sixteenth aspect causes a computer to execute a first step of performing a switching control from mechanical correction of mechanically performing shake correction of a subject image to electronic correction of electronically performing the shake correction of the subject image, by synchronizing operations of the mechanical correction and the electronic correction, and a second step of performing a switching control from the electronic correction to the mechanical correction by a switching control different from the switching control in the first step.

A shake correction control device according to one embodiment of the present disclosure comprises an acquisition unit that acquires imaging information for selecting mechanical correction of mechanically performing shake correction of a subject image or electronic correction of electronically performing the shake correction of the subject image, and a at least one processor configured to perform a first control for performing a switching control from the mechanical correction to the electronic correction by synchronizing shake correction operations of the mechanical correction and the electronic correction and a second control for performing a switching control from the electronic correction to the mechanical correction based on the imaging information acquired by the acquisition unit, the processor performing different controls between the first control and the second control.

According to one embodiment of the present disclosure, a shake correction control device, an imaging apparatus, a shake correction method of an imaging apparatus, and a program capable of using both of mechanical correction and electronic correction and reducing awkwardness in a case of switching between the mechanical correction and the electronic correction are provided.

BRIEF DESCRIPTION OF THE DRAWINGS

Exemplary embodiments of the present invention will be described in detail based on the following figures, wherein.

DETAILED DESCRIPTION

Hereinafter, an example of embodiments of the technology of the present disclosure will be described with reference to the drawings.

First, terms used in the following description will be described. In the following description, the abbreviation "CMOS" stands for "Complementary Metal Oxide Semiconductor". The abbreviation "CCD" stands for "Charge Coupled Device". The abbreviation "CPU" stands for "Central Processing Unit". The abbreviation "ROM" stands for "Read Only Memory". The abbreviation "RAM" stands for "Random Access Memory". The abbreviation "I/F" stands for "Interface". The abbreviation "ASIC" stands for "Application Specific Integrated Circuit". The abbreviation "FPGA" stands for "Field Programmable Gate Array". The abbreviation "SSD" stands for "Solid State Drive". The abbreviation "USB" stands for "Universal Serial Bus". The abbreviation "CD-ROM" stands for "Compact Disc Read Only Memory". The abbreviation "IC" stands for "Integrated Circuit". The abbreviation "PLD" stands for "Programmable Logic Device". The abbreviation "AFE" stands for "Analog Front End". The abbreviation "DSP" stands for "Digital Signal Processor". The abbreviation "A/D" stands for "Analog/Digital". The abbreviation "WAN" stands for "Wide Area Network". The abbreviation "AE" stands for "Automatic Exposure".

First Embodiment

Figure 1:
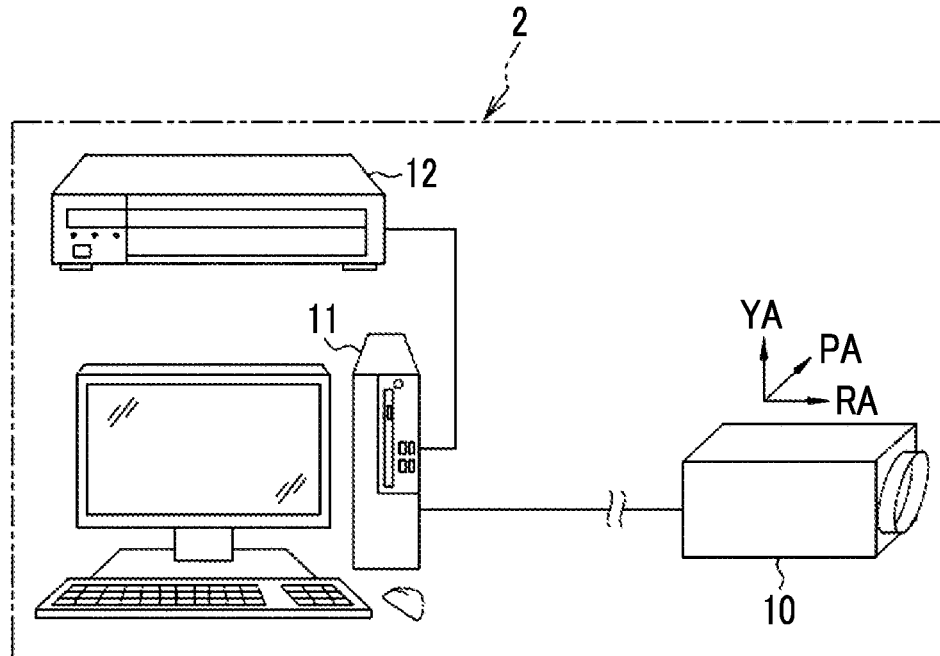
FIG. 1 is a diagram illustrating a monitoring camera system according to a first embodiment.

As illustrated in FIG. 1 as an example, a monitoring camera system 2 comprises a monitoring camera 10, a management apparatus 11, and a storage apparatus 12. The monitoring camera 10 is an example of an "imaging apparatus" according to the embodiments of the technology of the present disclosure, and is installed on a post, a wall, or the like in an indoor or outdoor space and generates a motion picture by capturing an image of a monitoring region. The monitoring camera 10 transmits the generated motion picture to the management apparatus 11. The management apparatus 11 is installed in a different location from the monitoring camera 10. Here, the "different location" refers to, for example, a management room. The management apparatus 11 receives the motion picture from the monitoring camera 10. The management apparatus 11 transmits the received motion picture to the storage apparatus 12 and stores the motion picture in the storage apparatus 12.

Figure 2:
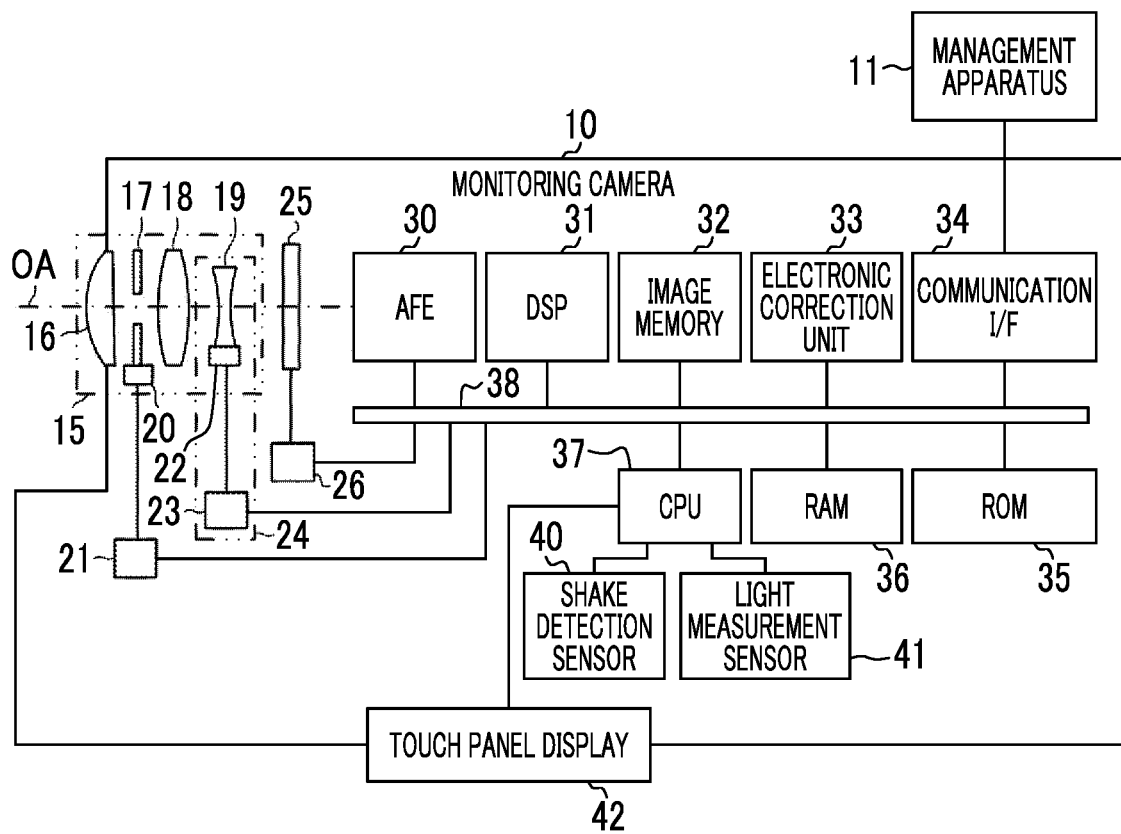
FIG. 2 is a block diagram of a monitoring camera.

As illustrated in FIG. 2 as an example, the monitoring camera 10 includes an imaging optical system 15. The imaging optical system 15 comprises a first optical system 16, a stop 17, a second optical system 18, and a correction optical system 19. The first optical system 16 is an optical system including an objective lens and forms an image of subject light showing a subject as a subject image on a light-receiving surface of an imaging element 25 described later. The stop 17 adjusts a light quantity of the subject image reaching the second optical system 18 from the first optical system 16. An actuator 20 is attached to the stop 17. Driving of the actuator 20 is controlled by a driver 21. By driving the actuator 20 under control of the driver 21, an opening degree of the stop 17 is changed.

Vibrations (hereinafter, simply referred to as the "vibrations") exerted on the monitoring camera 10 include, in a case of the outdoor space, vibrations caused by traffic of an automobile, vibrations caused by wind, vibrations caused by construction work, and the like and, in a case of the indoor space, vibrations caused by an operation of an air conditioner, vibrations caused by entrance and exit of a person, and the like. The correction optical system 19 is an optical system for correcting an image shake (hereinafter, referred to as the "shake") of the subject image caused by the vibrations. An actuator 22 is attached to the correction optical system 19. Driving of the actuator 22 is controlled by a driver 23. By driving the actuator 22 under control of the driver 23, the correction optical system 19 mechanically moves with respect to an optical axis OA.

In the present embodiment, the "shake" refers to a phenomenon that occurs by a change in the optical axis OA with respect to the subject image due to the vibrations. Here, the "optical axis OA" refers to an optical axis of the objective lens of the first optical system 16. For example, the change in the optical axis OA means that the optical axis OA is inclined with respect to a reference axis (for example, the optical axis OA before an occurrence of the shake) due to the shake. In the present embodiment, correction of the shake includes a meaning of removing the shake and also a meaning of reducing the shake.

A mechanical correction unit 24 that mechanically corrects the shake of the subject image is implemented by the correction optical system 19, the actuator 22, and the driver 23. Various well-known methods can be employed as a method of correcting the shake by the mechanical correction unit 24. The simplest method is such that the mechanical correction unit 24 moves the correction optical system 19 in a direction of canceling out the shake by an amount of canceling out the shake.

The imaging element 25 is arranged in a rear stage of the imaging optical system 15. The imaging element 25 is a CMOS image sensor or a CCD image sensor. The imaging element 25 images the subject image acquired by the imaging optical system 15 and outputs an analog imaging signal at a predetermined frame rate under control of a driver 26. Here, for example, the "predetermined frame rate" refers to a few frames/second to a few tens of frames/second.

The monitoring camera 10 includes an AFE 30, a DSP 31, an image memory 32, an electronic correction unit 33, a communication I/F 34, a ROM 35, a RAM 36, a CPU 37, and the like. The AFE 30, the DSP 31, the image memory 32, the electronic correction unit 33, the communication I/F 34, the ROM 35, the RAM 36, and the CPU 37 are connected to each other through a busline 38. The ROM 35, the RAM 36, the CPU 37, and the busline 38 are an example of a "computer" according to the embodiments of the technology of the present disclosure.

The AFE 30 receives the analog imaging signal from the imaging element 25. The AFE 30 performs analog signal processing such as correlative double sampling and automatic gain adjustment on the analog imaging signal and then, converts the analog imaging signal into a digital imaging signal by performing A/D conversion. In a case where the imaging element 25 is the CMOS image sensor, the AFE 30 is integrated in the CMOS image sensor.

The DSP 31 performs various types of digital signal processing on the digital imaging signal. For example, the various types of digital signal processing refer to demosaicing, noise removal processing, gradation correction processing, and color correction processing. The DSP 31 outputs the imaging signal after digital signal processing to the image memory 32. The image memory 32 stores the imaging signal from the DSP 31 as an image representing the subject image.

The electronic correction unit 33 electronically corrects the shake of the subject image by performing image processing on the image stored in the image memory 32. In the same manner as in a case of the mechanical correction unit 24, various well-known methods can be employed as a method of correcting the shake by the electronic correction unit 33.

For example, the method of correcting the shake by the electronic correction unit 33 is exemplified by an image output region cutout method and an image comparison method. In the image output region cutout method, first, the imaging element 25 sets an imaging region to be larger than a region (hereinafter, referred to as an "image output region") finally output as the image. The electronic correction unit 33 cuts out an image corresponding to the image output region from the image stored in the image memory 32. At this point, the electronic correction unit 33 changes a cutout position of the image output region depending on the shake.

In the image comparison method, first, the electronic correction unit 33 acquires two images preceding and succeeding in time series from the image memory 32 and compares the acquired two images. Next, the electronic correction unit 33 calculates a deviation amount and a deviation direction of the succeeding image with respect to the image preceding in time series based on a result of comparison between the images. The electronic correction unit 33 processes the succeeding image into an image in which the calculated deviation amount and the deviation direction are canceled out.

The communication I/F 34 reads out the image from the image memory 32 and transmits the read image to the management apparatus 11. For example, the communication OF 34 is a network interface. The network interface controls transfer of various types of information with respect to the management apparatus 11 through a network. An example of the network is exemplified by a WAN such as the Internet or a public communication network.

The ROM 35 stores various programs such as a control program of the monitoring camera 10 and various types of data accompanied by the various programs. The RAM 36 is a work memory for the CPU 37 to execute processing. The CPU 37 reads out a program stored in the ROM 35 into the RAM 36 and executes processing complying with the read program. Accordingly, the CPU 37 controls an overall operation of each unit of the monitoring camera 10.

A shake detection sensor 40, a light measurement sensor 41, and a touch panel display 42 are connected to the CPU 37. For example, the shake detection sensor 40 is a gyro sensor. The gyro sensor detects an angular velocity, that is, a rotational shake, about each axis (refer to FIG. 1) of a pitch axis PA, a yaw axis YA, and a roll axis RA (axis parallel to the optical axis OA). In addition, for example, the shake detection sensor 40 is an acceleration sensor. The acceleration sensor detects a shift shake within a plane parallel to the pitch axis PA and the yaw axis YA. The shake detection sensor 40 outputs a detection signal of the shake as shake information to the CPU 37. A meaning of being parallel in the present embodiment includes a meaning of being completely parallel and also a meaning of being approximately parallel including an error allowed in design and manufacturing.

The light measurement sensor 41 measures the light quantity of the subject image for each frame in order to perform an AE control. The light measurement sensor 41 outputs a measurement signal of the light quantity to the CPU 37.

The touch panel display 42 is a device in which a touch panel is overlaid on a display. The display displays various types of information including an image under control of the CPU 37. The touch panel is overlaid on a display screen of the display and receives contact with a finger of a user or an instruction object such as a touch pen. A setting screen or the like for performing various types of setting of the monitoring camera 10 is displayed on the touch panel display 42. The touch panel display 42 receives an input of an operation instruction from the user through the setting screen or the like.

Figure 3:
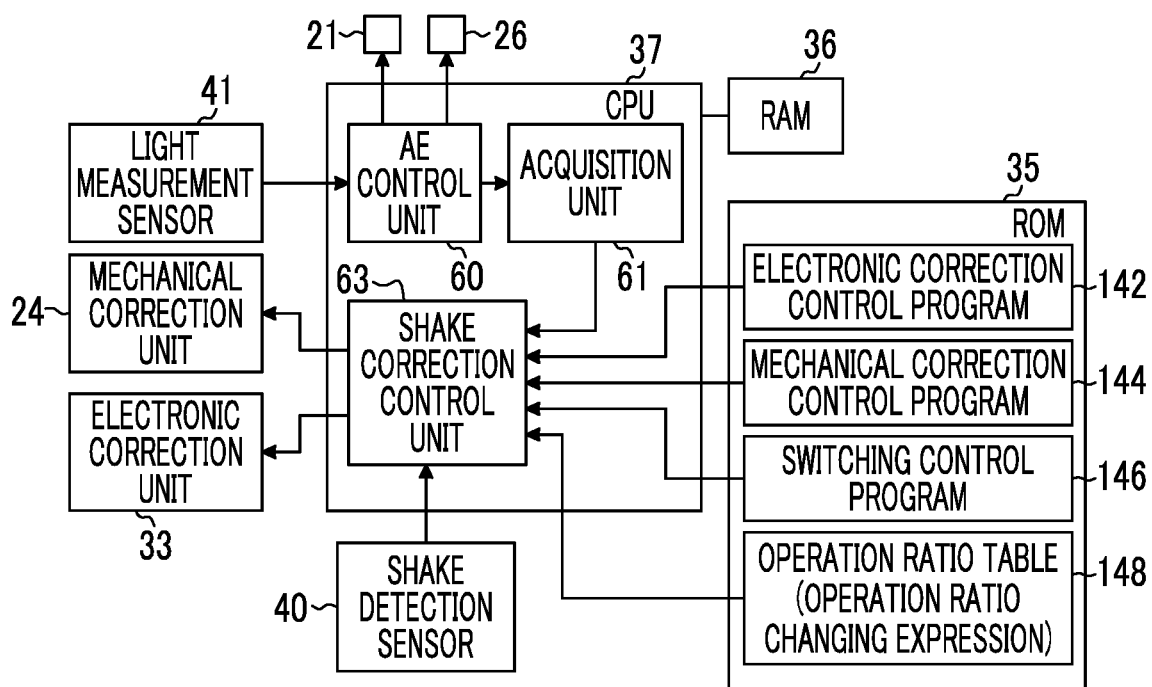
FIG. 3 is a block diagram of a control-related portion of the monitoring camera.

As illustrated in FIG. 3 as an example, the ROM 35 stores an electronic correction control program 142, a mechanical correction control program 144, a switching control program 146, an operation ratio table 148, and the like. The electronic correction control program 142 is a program for performing an electronic shake correction control (hereinafter, referred to as "electronic correction"). The mechanical correction control program 144 is a program for performing a mechanical shake correction control (hereinafter, referred to as "mechanical correction"). The switching control program 146 is a program for performing a shake correction control in a case of switching between the mechanical correction and the electronic correction.

While illustration is not provided, the ROM 35 also stores, besides each of the correction control programs 142 and 144 and the switching control program 146, an automatic exposure adjustment program, an automatic focal point adjustment program, and the like for controlling the monitoring camera 10. The switching control program 146 is an example of a program causing a computer to execute a switching control according to the embodiments of the technology of the present disclosure.

The CPU 37 functions as the AE control unit 60, the acquisition unit 61, and the shake correction control unit 63 in cooperation with the RAM 36 and the like by executing various programs stored in the ROM 35.

The AE control unit 60 receives the measurement signal of the light quantity from the light measurement sensor 41. The AE control unit 60 sets an exposure value corresponding to the received measurement signal of the light quantity. The AE control unit 60 sets the exposure value for each frame. More specifically, the AE control unit 60 sets the exposure value of the subsequent frame based on the measurement signal of the previous frame.

The AE control unit 60 calculates the opening degree of the stop 17 corresponding to the set exposure value. The AE control unit 60 drives the actuator 20 through the driver 21 such that the actual opening degree of the stop 17 is set to the calculated opening degree.

In addition, the AE control unit 60 calculates an exposure time period of the subject image corresponding to the set exposure value in the imaging element 25. The AE control unit 60 drives the imaging element 25 through the driver 26 such that the actual exposure time period is set to the calculated exposure time period. The AE control unit 60 outputs the calculated exposure time period to the acquisition unit 61.

The acquisition unit 61 acquires the exposure time period output from the AE control unit 60. The exposure time period is an example of "imaging information" for selecting the mechanical correction or the electronic correction. As described above, since the AE control unit 60 sets the exposure value for each frame, the AE control unit 60 calculates the exposure time period for each frame and outputs the exposure time period to the acquisition unit 61 for each frame. The acquisition unit 61 outputs the acquired exposure time period to the shake correction control unit 63.

The shake correction control unit 63 receives the detection signal of the shake from the shake detection sensor 40. The shake correction control unit 63 controls operations of the mechanical correction unit 24 and the electronic correction unit 33 based on the received detection signal in order to cancel out the shake of the subject image.

The shake correction control unit 63 determines whether to perform the mechanical correction by the mechanical correction unit 24 or the electronic correction by the electronic correction unit 33 based on the exposure time period received from the acquisition unit, and executes the switching control in a case where it is determined that switching is necessary. The shake correction control unit 63 calculates a shake correction amount using the detection signal of the shake received from the shake detection sensor 40. The shake correction control unit 63 calculates an amount to be corrected by the mechanical correction unit 24 and an amount to be corrected by the electronic correction unit 33 in the calculated shake correction amount. The shake correction control unit 63 causes the mechanical correction unit 24 to correct a calculated mechanical correction amount. In addition, the shake correction control unit 63 causes the electronic correction unit 33 to correct a calculated electronic correction amount. Hereinafter, the amount to be corrected by the mechanical correction unit 24 will be referred to as the mechanical correction amount, and the amount to be corrected by the electronic correction unit 33 will be referred to as the electronic correction amount.

Figure 4:
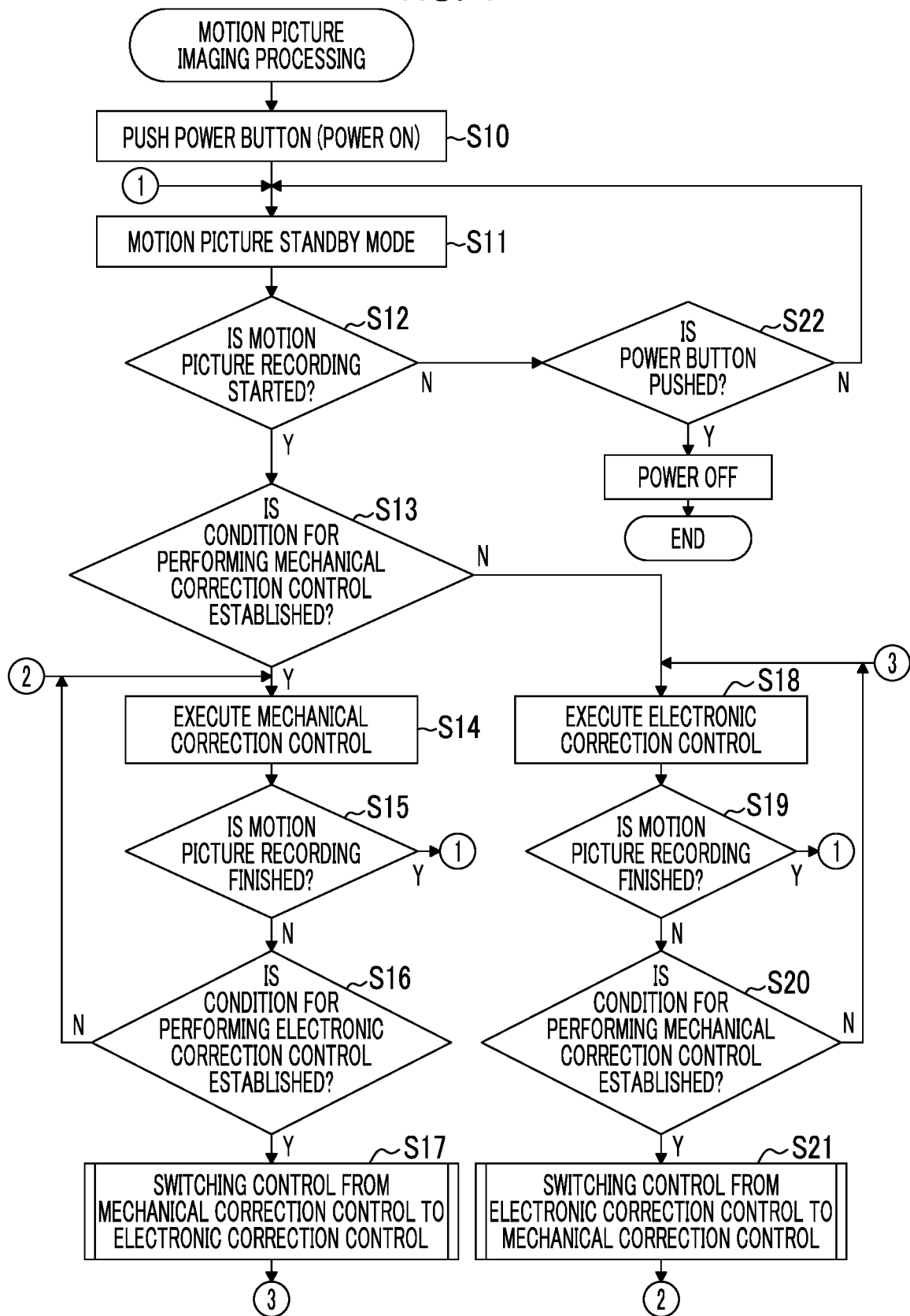
FIG. 4 is a flowchart of motion picture imaging processing including shake correction processing according to the first embodiment.

Next, an operation of the monitoring camera 10 having the above configuration will be described. First, a flow of motion picture imaging processing including shake correction processing performed by the monitoring camera 10 will be described. As illustrated in FIG. 4 as an example, first, in step S10, power is ON in a case where a power button is pushed. In a case where the power is ON, a motion picture standby mode is set in step S11. In a case where the power button is pushed, the monitoring camera 10 may be operated to start motion picture recording without passing through the motion picture standby mode.

Next, in step S12, the CPU 37 determines whether or not to start the motion picture recording. The motion picture recording will be referred to as the "picture recording". In the present embodiment, for example, whether or not to start the picture recording is determined depending on whether or not a picture recording button is pushed. In step S12, in a case where the picture recording button is not pushed, a negative determination is made, and a transition is made to step S22. In step S22, the CPU 37 determines whether or not the power button is pushed. In step S22, in a case where the power button is pushed, the power is OFF, and the motion picture imaging processing is finished. In step S22, in a case where the power button is not pushed, a negative determination is made, and a return is made to the motion picture standby mode in step S11.

In step S12, in a case where the picture recording button is pushed, a positive determination is made, and a transition is made to step S13. In step S13, the shake correction control unit 63 determines whether or not a condition for performing a mechanical correction control is established. In first embodiment, the condition for performing the mechanical correction control is a condition that the exposure time period is greater than or equal to a first threshold value. In step S13, in a case where the condition for performing the mechanical correction control is established, a positive determination is made, and a transition is made to step S14. The shake correction control unit 63 executes the mechanical correction control.

For example, the first threshold value of the exposure time period can be decided by switching from the mechanical correction control to an electronic correction control by changing an exposure time period condition, and performing a sensory test as to whether or not the user feels awkward due to a residual shake of the image. Alternatively, which degree of the residual shake occurs depending on a length of the exposure time period in an environment in which the monitoring camera is arranged may be calculated, and the first threshold value may be decided based on a magnitude of the residual shake.

The condition for performing the mechanical correction control is not limited to the condition corresponding to the exposure time period. For example, a condition of setting a magnitude of the shake detected by the shake detection sensor 40 and a predetermined threshold value of a cycle and checking whether or not the magnitude of the shake and the threshold value of the cycle are exceeded may be used. Alternatively, in an environment in which ambient brightness changes in a time range, the mechanical correction control and the electronic correction control may be switched in the time range. In this case, time is the condition for performing the mechanical correction control.

Next, in step S15, the CPU 37 determines whether or not a condition for finishing the motion picture recording is established. For example, the condition for finishing the motion picture recording is a condition that a picture recording stop button is pushed during the picture recording. In a case where the condition for finishing the motion picture recording is established in step S15, a positive determination is made, and the picture recording is stopped. A return is made to the motion picture standby mode in step S11.

In a case where the condition for finishing the motion picture recording is not established in step S15, a negative determination is made, and a transition is made to step S16. In step S16, the shake correction control unit 63 determines whether or not a condition for performing the electronic correction control is established. For example, the condition for performing the electronic correction control is a condition that the exposure time period is less than the first threshold value. In step S16, in a case where the condition for performing the electronic correction control is not established, a negative determination is made, and a return is made to step S14. In step S16, in a case where the condition for performing the electronic correction control is established, a positive determination is made, and a transition is made to step S17. The shake correction control unit 63 performs the switching control from the mechanical correction control to the electronic correction control. Details of step S17 will be described later.

Meanwhile, in step S13, in a case where the condition for performing the mechanical correction control is not established, a negative determination is made, and a transition is made to step S18. The shake correction control unit 63 executes the electronic correction control. Next, a transition is made to step S19. The CPU 37 determines whether or not the condition for finishing the motion picture recording is established. In a case where the condition for finishing the motion picture recording is established in step S19, a positive determination is made, and the picture recording is stopped. A return is made to the motion picture standby mode in step S11.

In a case where the condition for finishing the motion picture recording is not established in step S19, a negative determination is made, and a transition is made to step S20. In step S20, the shake correction control unit 63 determines whether or not the condition for performing the mechanical correction control is established. In step S20, in a case where the condition for performing the mechanical correction control is not established, a negative determination is made, and a return is made to step S18. In step S20, in a case where the condition for performing the mechanical correction control is established, a positive determination is made, and a transition is made to step S21. The shake correction control unit 63 performs the switching control from the electronic correction control to the mechanical correction control. Details of step S21 will be described later.

Next, the switching control in step S17 will be described. Step S17 is the switching control that is performed in a switching stage from a time at which a control for performing the entire necessary shake correction by the mechanical correction is performed, to a start of a control for performing the entire necessary shake correction by the electronic correction. Hereinafter, a state where the control for performing the entire necessary shake correction by the mechanical correction will be referred to as a "first state", and a state where the control for performing the entire necessary shake correction by the electronic correction will be referred to as a "second state". A state where the control in the switching stage from the first state to the second state will be referred to as a "third state". The control in the third state is an example of a "first control" according to the embodiments of the technology of the present disclosure. A time period of the third state will be referred to as a switching time period T1 of the first control.

Here, an effect of performing the switching control in step S17 will be described. As illustrated in an upper part of FIG. 5, a case where the exposure time period is gradually shortened with time, the shake correction is performed by the mechanical correction in a case where the exposure time period is greater than or equal to the first threshold value, and the shake correction is performed by switching to the electronic correction after the exposure time period is less than the first threshold value is considered.

Figure 5:
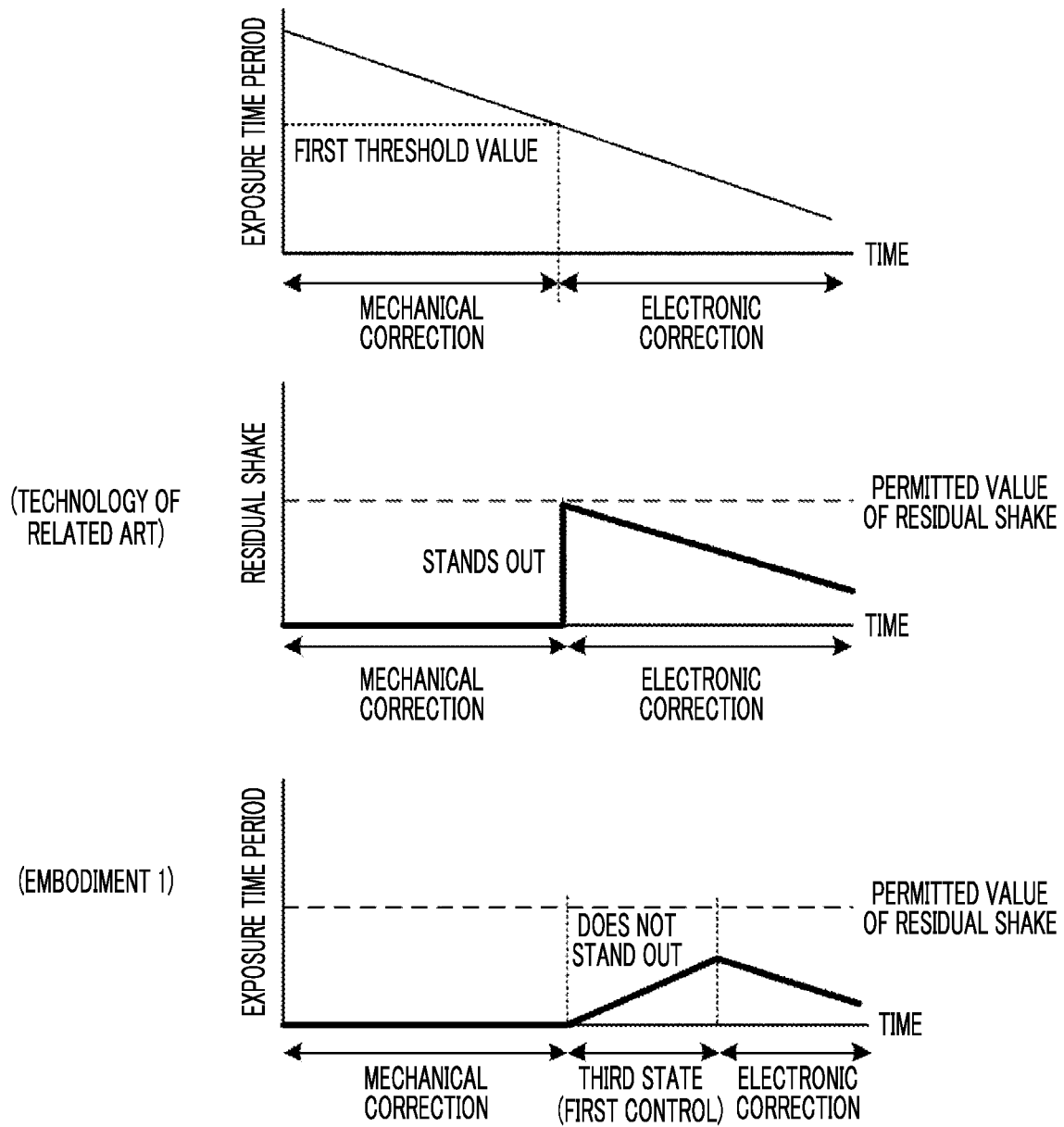
FIG. 5 is a diagram for describing an effect of performing a first control.

In the technology of the related art, as illustrated in a middle part of FIG. 5, the residual shake is rapidly increased after switching to the electronic correction from the mechanical correction. This residual shake is an amount permitted as quality of the image. However, since the residual shake is rapidly increased and stands out in a case where the user views the residual shake, the user may feel awkward. Therefore, in first embodiment, as illustrated in a lower part of FIG. 5, the third state of using both of the mechanical correction and the electronic correction is provided in a case of switching to the electronic correction. By providing the third state, the residual shake is slightly increased. Thus, the feeling of awkwardness can be reduced.

The switching control in step S17 refers to the first control which is the control in the third state. The first control is the switching control from the mechanical correction by the mechanical correction unit 24 to the electronic correction by the electronic correction unit 33 and is a control for performing shake correction operations of the mechanical correction unit 24 and the electronic correction unit 33 in synchronization. Performing the shake correction operations of the mechanical correction unit 24 and the electronic correction unit 33 in synchronization means using both of the shake correction of the mechanical correction unit 24 and the shake correction of the electronic correction unit 33.

The shake correction by the mechanical correction unit 24 will be referred to as a first operation. The shake correction by the electronic correction unit 33 will be referred to as a second operation. A ratio of a shake correction amount of the mechanical correction unit 24 to a correction amount necessary for the shake correction will be referred to as a first operation ratio. A ratio of a shake correction amount of the electronic correction unit 33 to the correction amount necessary for the shake correction will be referred to as a second operation ratio. The first operation ratio and the second operation ratio will be simply referred to as the "operation ratio" unless otherwise necessary to distinguish therebetween.

Figure 6:
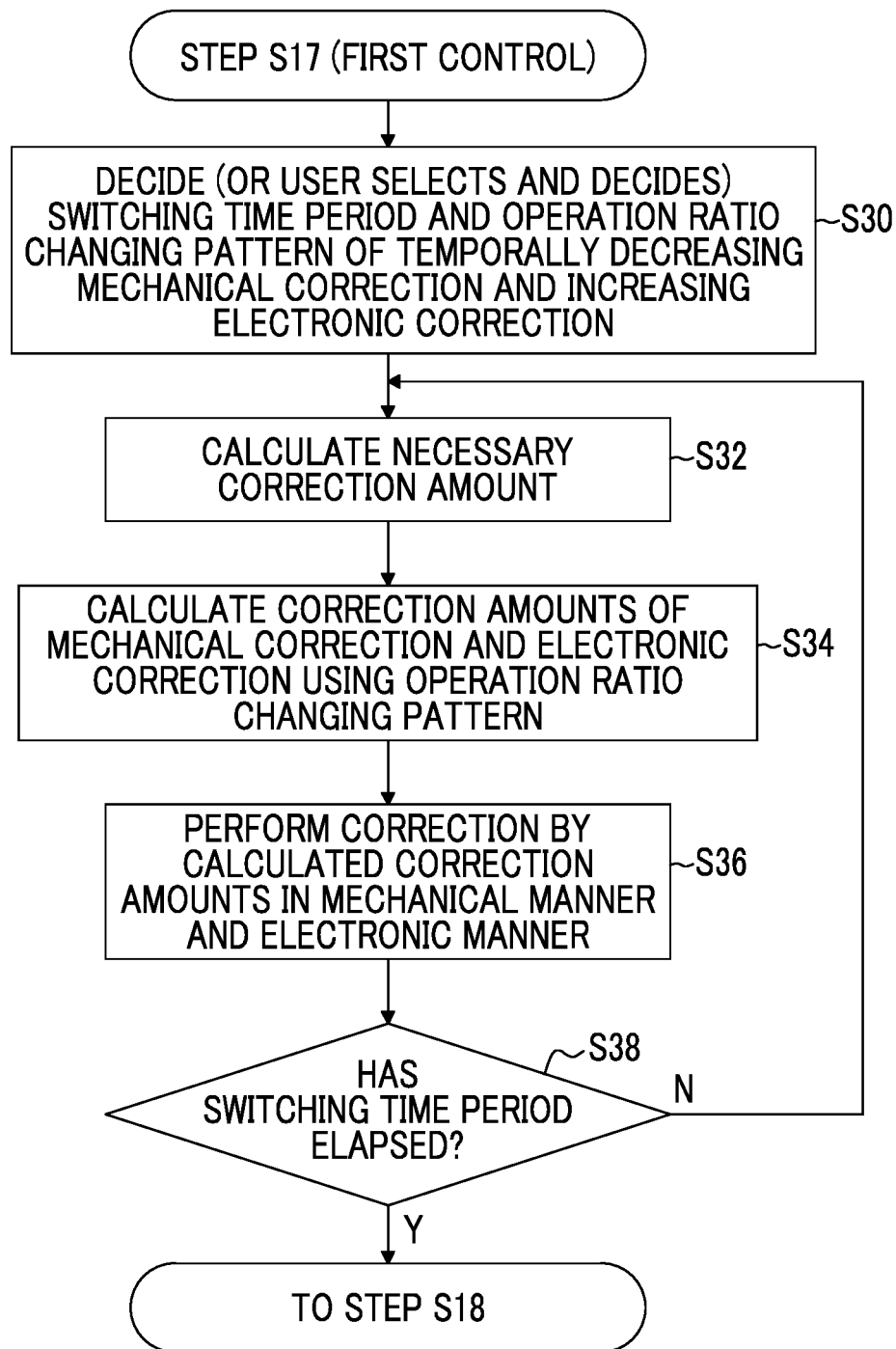
FIG. 6 is a processing flowchart of the first control according to the first embodiment.

Next, the first control in step S17 will be described with reference to the drawings. As illustrated in FIG. 6 as an example, first, in step S30, the shake correction control unit 63 decides the switching time period T1 and a temporal operation ratio changing pattern of the first operation ratio of the mechanical correction and the second operation ratio of the electronic correction. The operation ratio changing pattern and/or the switching time period T1 may be changeable by the user, that is, may be selected and decided by the user. The temporal operation ratio changing pattern is a pattern of changing the first operation ratio and the second operation ratio with an elapse of time.

In step S30, a control pattern of decreasing the first operation ratio with the elapse of time and increasing the second operation ratio with the elapse of time from a start to an end of the first control is decided. For example, the control pattern may be an operation ratio table in which a specific operation ratio is defined for each time period. Alternatively, the pattern may be an operation ratio changing expression such as a function expression. The operation ratio changing expression may be changed for each time region. Here, "increasing with the elapse of time" does not necessarily mean continuous increasing, and increasing may be temporarily stopped. Similarly, "decreasing with the elapse of time" does not necessarily mean continuous decreasing, and decreasing may be temporarily stopped.

Figure 7:
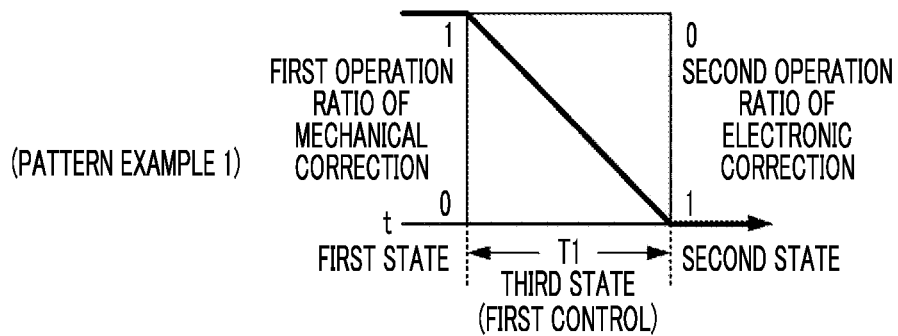
FIG. 7 is an example of a pattern of changing an operation ratio between mechanical correction and electronic correction of the first control according to the first embodiment.
Figure 7:
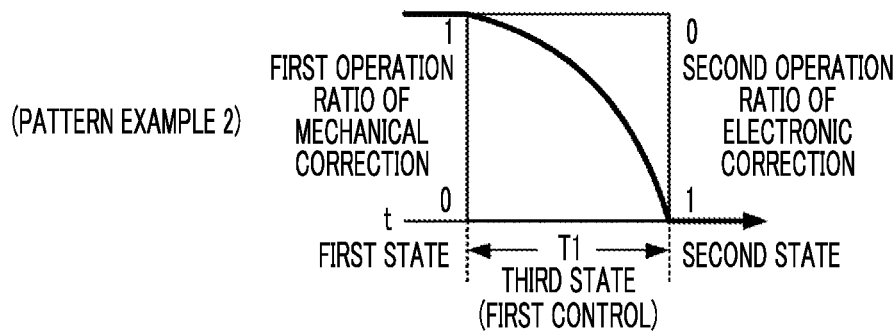
Figure 7:
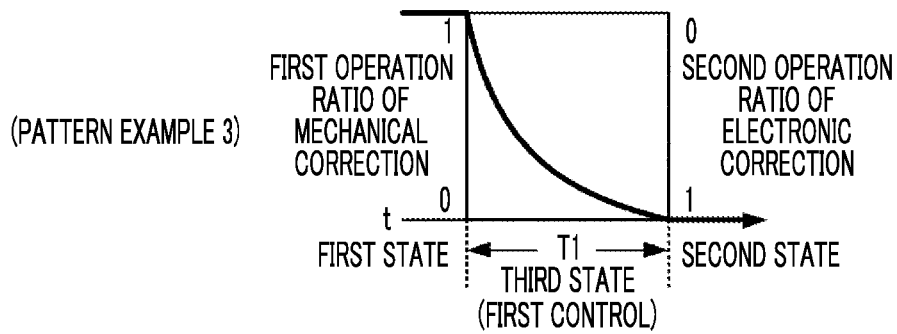
Figure 7:
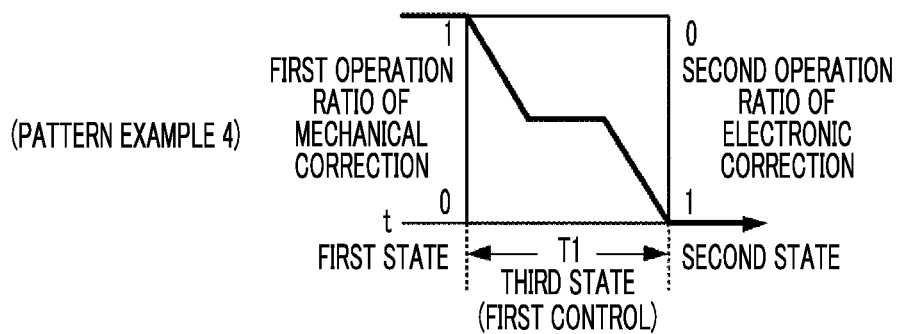

As the temporal operation ratio changing pattern, for example, various patterns can be set as illustrated in Pattern Example 1 to Pattern Example 4 in FIG. 7. Pattern Example 1 to Pattern Example 4 in FIG. 7 are graphs having a horizontal axis denoting elapsed time, a left vertical axis denoting the first operation ratio of the mechanical correction, and a right vertical axis denoting the second operation ratio of the electronic correction. Pattern Example 1 is a pattern in which the first operation ratio of the mechanical correction is linearly decreased from 1 to 0 in proportion to the elapsed time. Conversely, the second operation ratio of the electronic correction is linearly increased from 0 to 1 in proportion to the elapsed time. As the operation ratio changing pattern, an optimal pattern that does not cause the residual shake to stand out is decided in advance by experiment and stored in an operation ratio table (operation ratio changing expression) 148. Alternatively, the user may be able to select the operation ratio changing pattern from several patterns. The first operation ratio and the second operation ratio are numerical values that are 1 in a case where both of the numerical values are added.

Pattern Example 2 in FIG. 7 is a convex-upward quadratic curve pattern in which a decrease ratio of the first operation ratio is increased with the elapse of time. Pattern Example 3 is a convex-downward quadratic curve pattern in which the decrease ratio of the first operation ratio is conversely decreased with the elapse of time. Pattern Example 4 is a pattern that changes stepwise. However, the temporal operation ratio changing pattern is not limited to Pattern Examples 1 to 4.

A length of the switching time period T1 of the first control is not particularly limited. For example, a few milliseconds to a few seconds can be set depending on a condition. In addition, the switching time period T1 may be defined as the number of frames corresponding to the length of the time period. The switching time period is defined in advance by testing and stored in the operation ratio table (operation ratio changing expression) 148 in the ROM 35. In addition, a plurality of the switching time periods T1 may be stored in advance in the ROM 35 and be changeable (selectable) by the user.

Returning to FIG. 6, in step S32, the shake correction control unit 63 calculates a necessary shake correction amount using the detection signal of the shake received from the shake detection sensor 40. Next, a transition is made to step S34. The shake correction control unit 63 calculates a correction amount to be distributed to each of the mechanical correction unit 24 and the electronic correction unit 33 in accordance with the operation ratio changing pattern decided in step S30. Next, a transition is made to step S36. The shake correction control unit 63 performs correction by each calculated correction amount in a mechanical manner and an electronic manner. That is, the shake correction control unit 63 performs correction by the correction amount of the mechanical correction by controlling the mechanical correction unit 24. In addition, the shake correction control unit 63 performs correction by the correction amount of the electronic correction by controlling the electronic correction unit 33.

The shake correction processing executed in step S36 will be specifically described. The shake correction control unit 63 obtains the correction amount for the mechanical correction by multiplying the necessary shake correction amount calculated in step S32 by the first operation ratio based on the operation ratio changing pattern. The shake correction control unit 63 performs correction by the obtained correction amount for the mechanical correction by controlling the mechanical correction unit 24. In addition, the shake correction control unit 63 controls the electronic correction unit 33. For example, the shake correction control unit 63 calculates a displacement direction and a displacement amount of a common target by comparing stored two consecutive frame images. An image of a predetermined region displaced in the calculated displacement direction is cut out from the succeeding frame image and displayed. The two frame images are images on which the shake correction is partially performed by the mechanical correction unit 24. The remaining shake amount is corrected by the electronic correction unit 33.

Next, a transition is made to step S38. The shake correction control unit 63 determines whether or not the elapsed time has elapsed past the time period T1 decided in step S30. In a case where the elapsed time has not elapsed past the switching time period T1 decided in step S30, a negative determination is made, and a return is made to step S32. In a case where the elapsed time has elapsed past the switching time period T1 decided in step S30, a positive determination is made. Processing of step S17 is finished, and a transition is made to step S18 in FIG. 4.

Figure 8:
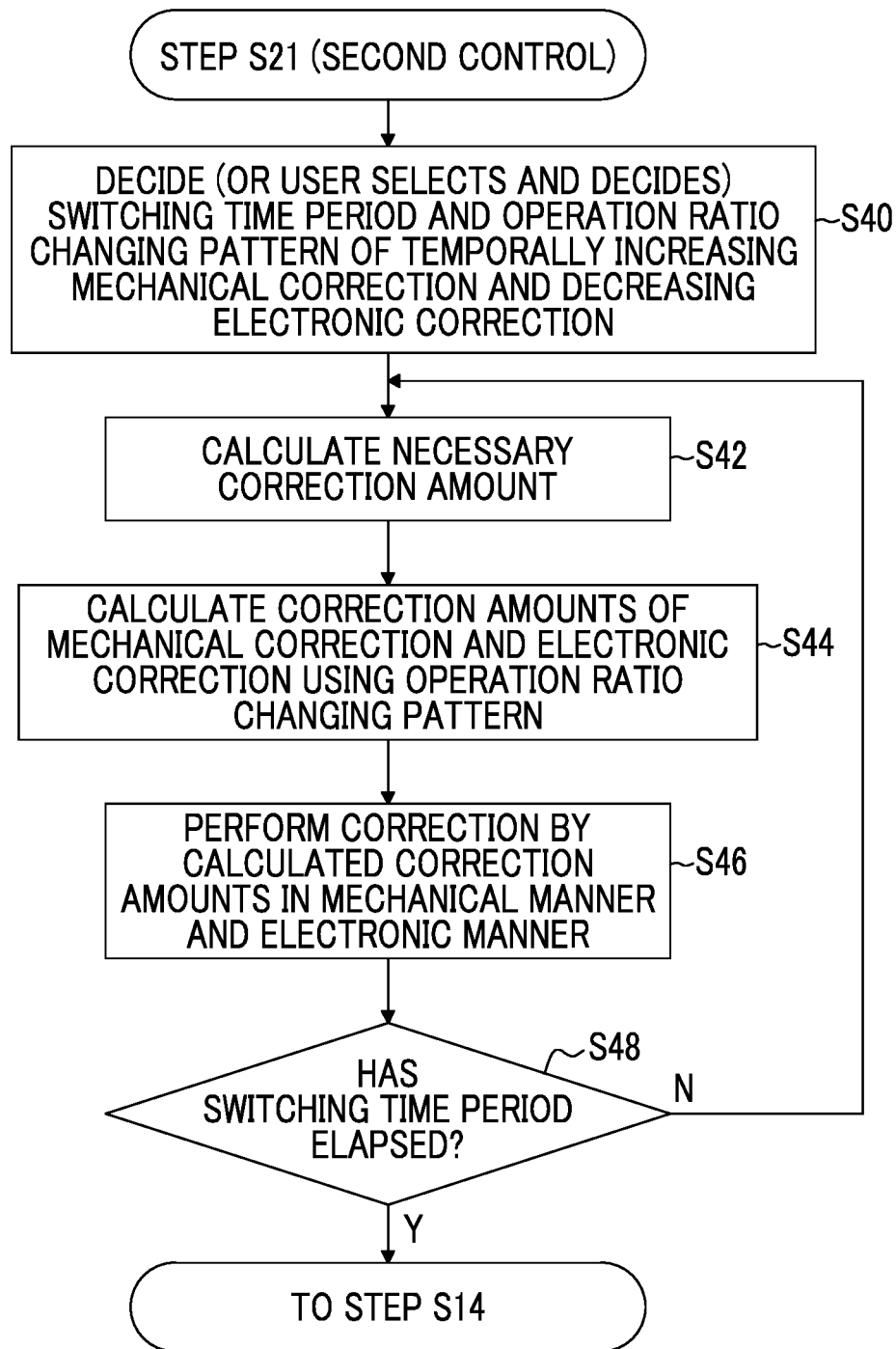
FIG. 8 is a processing flowchart of a second control according to the first embodiment.

Next, a second control for switching from the electronic correction to the mechanical correction in step S21 will be described. As illustrated in FIG. 8 as an example, first, in step S40, the shake correction control unit 63 decides a switching time period T2 and a temporal operation ratio changing pattern of increasing the first operation ratio of the mechanical correction with the elapse of time and decreasing the second operation ratio of the electronic correction with the elapse of time. The user may select and decide the operation ratio changing pattern and/or the switching time period T2. The temporal operation ratio changing pattern is the same as described in step S17. However, a direction of increase or decrease in operation ratio is opposite to a case of step S17. A state where a control in a switching stage from the second state to the first state will be referred to as a "fourth state". The switching control in step S21 refers to the fourth state. The fourth state is a switching control state from the shake correction by the electronic correction unit 33 to the shake correction by the mechanical correction unit 24.

The fourth state includes a control state where the shake correction operations of the mechanical correction unit 24 and the electronic correction unit 33 are performed in synchronization from the start to the end of the control, and a control state without synchronization. The control in the fourth state is an example of a "second control" according to the embodiments of the technology of the present disclosure. A time period of the fourth state will be referred to as the switching time period T2 of the second control. A length of the switching time period T2 is not particularly limited. For example, zero seconds to a few seconds can be set depending on various conditions. The switching time period T2 may be defined as the number of frames.

The first embodiment is an embodiment of performing different controls between the first control and the second control. Specifically, time responsiveness is different between the first control and the second control. While a form of differently setting the time responsiveness is not limited, a length of a time period of the first control and a length of a time period of the second control are differently set in the first embodiment. Specifically, the length of the switching time period T1 is longer than the switching time period T2. In the first embodiment, as long as this condition is satisfied, the lengths of the switching time period T1 and the switching time period T2 are not particularly limited.

In the first embodiment, the temporal operation ratio changing pattern is not limited. In the second control, by synchronizing the shake correction operations of the mechanical correction unit 24 and the electronic correction unit 33 from a start to an end of the second control, the first operation ratio is increased with the elapse of time, and the second operation ratio is decreased with the elapse of time. Besides, as will be described later, switching may be immediately performed from a shake correction control by the electronic correction unit 33 to a shake correction control by the mechanical correction unit 24 without synchronizing the shake correction operations of the mechanical correction unit 24 and the electronic correction unit 33.

Figure 9:
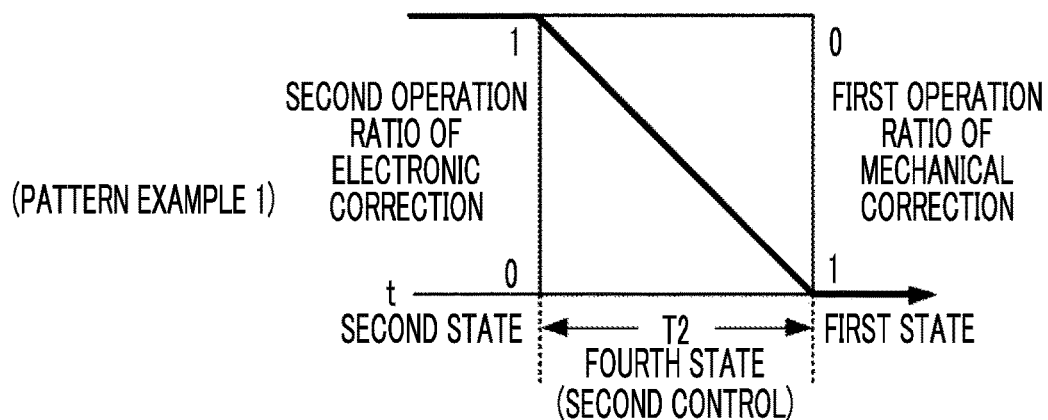
FIG. 9 is an example of a pattern of changing an operation ratio between mechanical correction and electronic correction of the second control according to the first embodiment.
Figure 9:
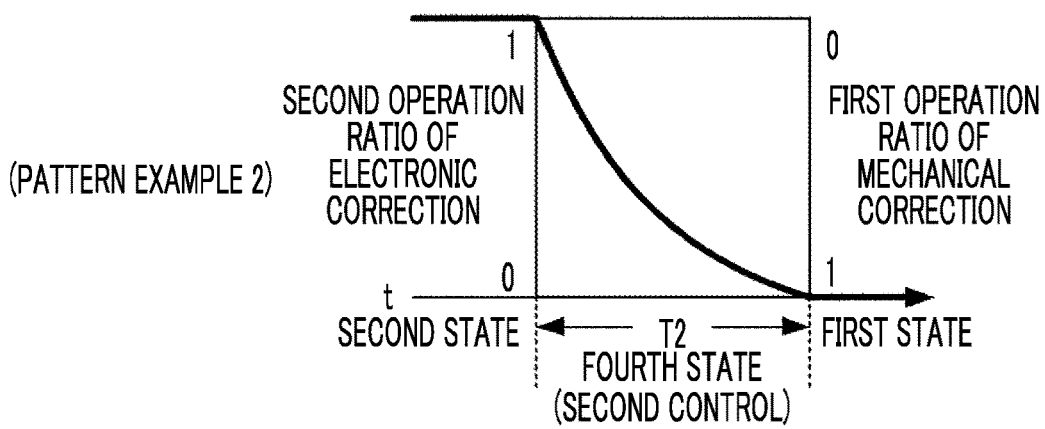
Figure 9:
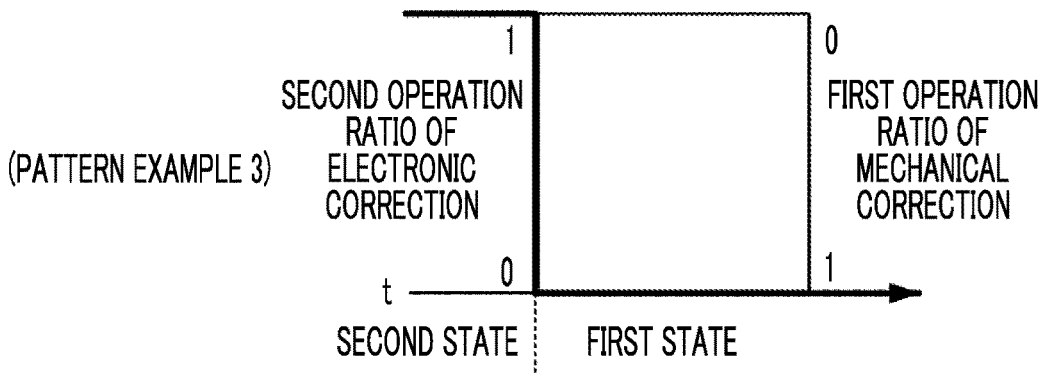
Figure 9:
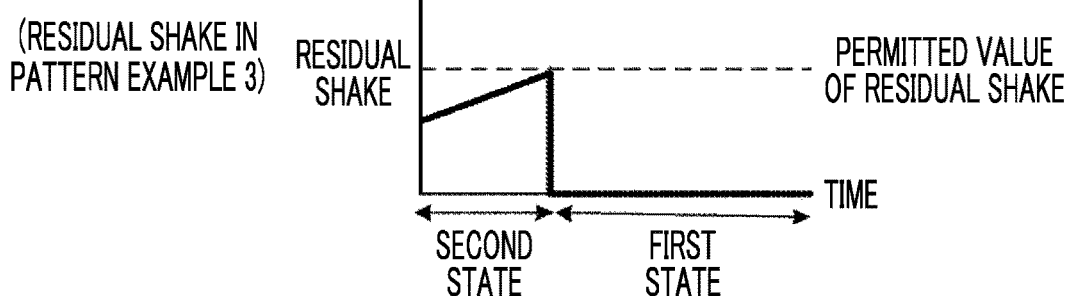

In a case of performing the shake correction operations of the mechanical correction unit 24 and the electronic correction unit 33 in synchronization from the start to the end of the second control, as illustrated in Pattern Example 1 in FIG. 9 as an example, the temporal operation ratio changing pattern may be a pattern that changes linearly. Pattern Example 1 to Pattern Example 3 in FIG. 9 are graphs having a horizontal axis denoting elapsed time, a left vertical axis denoting the second operation ratio of the electronic correction, and a right vertical axis denoting the first operation ratio of the mechanical correction. Pattern Example 1 is a pattern in which the second operation ratio of the electronic correction is linearly decreased from 1 to 0 in proportion to time. Conversely, the first operation ratio of the mechanical correction is linearly increased from 0 to 1 in proportion to the elapse of time.

In addition, the temporal operation ratio changing pattern may be a pattern such as Pattern Example 2. Pattern Example 2 is a convex-downward curve pattern in which a decrease ratio of the second operation ratio is decreased with the elapse of time.

Pattern Example 3 in FIG. 9 is a pattern in a case of performing an operation switching control from the shake correction by the electronic correction unit 33 to the shake correction by the mechanical correction unit 24 without synchronizing the shake correction operations of the mechanical correction unit 24 and the electronic correction unit 33. Pattern Example 3 is an example in which the switching time period T2 is substantially zero. In a case where switching is immediately performed to the mechanical shake correction from the electronic shake correction, the residual shake may be rapidly decreased as illustrated in a lowermost part of FIG. 9. However, since it is unlikely to feel awkward due to a decrease in residual shake, the pattern illustrated in Pattern Example 3 does not pose a problem. Accordingly, Pattern Example 3 is preferred in a case of prioritizing suppression of the residual shake. The temporal operation ratio changing pattern is not limited to Pattern Examples 1 to 3. For example, a pattern (not illustrated) that changes stepwise may be used.

Returning to FIG. 8, in step S42, the shake correction control unit 63 calculates the necessary shake correction amount using the shake information acquired from the shake detection sensor 40. Next, a transition is made to step S44. The shake correction control unit 63 calculates the correction amount of each of the mechanical correction and the electronic correction in accordance with the operation ratio changing pattern decided in step S40. Next, a transition is made to step S46. The shake correction control unit 63 performs correction by each calculated correction amount in a mechanical manner and an electronic manner. A control in step S46 is the same as a control described in step S36.

Next, a transition is made to step S48. The shake correction control unit 63 determines whether or not the elapsed time has elapsed past the time period T2 decided in step S40. In a case where the elapsed time has not elapsed past the switching time period T2 decided in step S40, a negative determination is made, and a return is made to step S42. In a case where the elapsed time has elapsed past the switching time period T2 decided in step S40, a positive determination is made. Processing of step S21 is finished, and a transition is made to step S14 in FIG. 4.

According to the first embodiment, first, by performing the first control, a phenomenon in which the shake of the image is rapidly increased in a case of transitioning from the first state of performing the shake correction 100% by the mechanical correction to the second state of performing the shake correction 100% by the electronic correction can be suppressed. In the electronic correction, a possibility of an occurrence of an uncorrectable shake, a so-called residual shake, is high. However, the amount of the residual shake is gradually increased by gradually decreasing the mechanical correction and gradually increasing the electronic correction. Accordingly, eyes become used to the residual shake, and the feeling of awkwardness is reduced.

Furthermore, the second control is executed in a case of transitioning from the second state to the first state. By executing the second control, the residual shake is gradually decreased, and awkwardness that the user feels can be reduced. The switching time period T2 of the second control is set to be shorter than the switching time period T1 of the first control. However, in a case of transitioning from the second state to the first state, the residual shake is in a direction of decrease. Thus, even in a case where the switching time period T2 is shorter than the switching time period T1, it is unlikely to feel awkward.

According to the monitoring camera 10 according to the first embodiment, both of the mechanical correction and the electronic correction can be used, and the feeling of awkwardness in a case of switching between the mechanical correction and the electronic correction can be reduced.

Second Embodiment

Hereinafter, a second embodiment will be described with reference to the drawings. In the first embodiment, the switching time period T1 of the first control is set to be longer than the switching time period T2 of the second control. Meanwhile, in the second embodiment, the switching time period T1 of the first control and the switching time period T2 of the second control are set to be the same time period, and the time responsiveness of the first control and the second control is differently set. For example, the time responsiveness in the second embodiment is the operation ratio changing pattern.

Figure 10A:
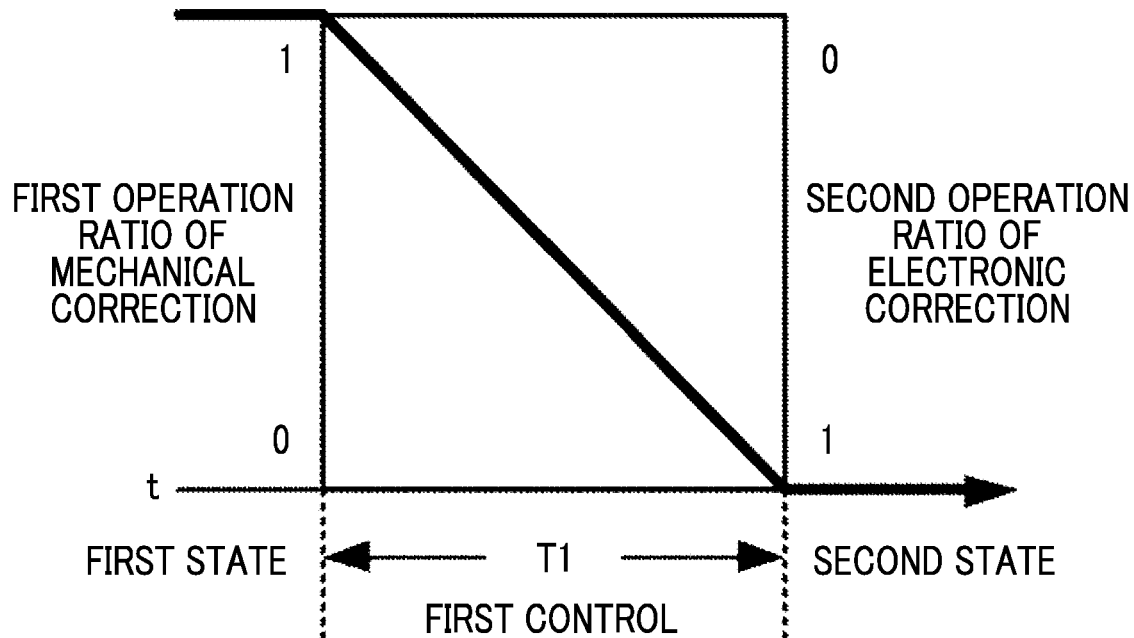
FIG. 10A is an example of a pattern of changing an operation ratio between mechanical correction and electronic correction of a first control according to a second embodiment.
Figure 10B:
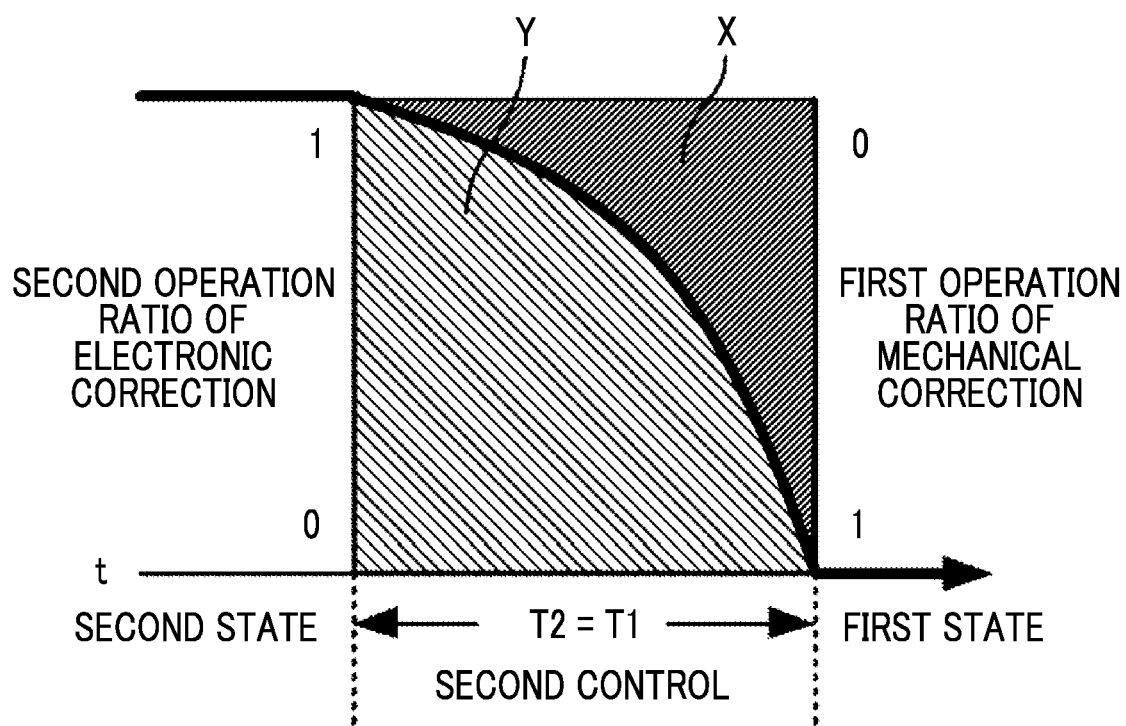
FIG. 10B is an example of a pattern of changing an operation ratio between mechanical correction and electronic correction of a second control according to a second embodiment.

Specifically, in the first control, for example, as in a pattern illustrated in FIG. 10A, the operation ratio is linearly changed. In the second control, for example, as illustrated in FIG. 10B, the operation ratio is changed in a convex-upward quadratic pattern. Here, for example, the operation ratio is changed such that an area of a region X illustrated in FIG. 10B is less than an area of a region Y. Accordingly, a usage ratio of the mechanical correction is decreased, compared to a case of linearly changing the operation ratio in the second control in the same manner as in the first control. Accordingly, while the switching time period T1 of the first control and the switching time period T2 of the second control are the same, an amount of power consumption can be reduced, compared to a case of linearly changing the operation ratio in the second control in the same manner as in the first control. The operation ratio changing pattern between the first control and the second control is not limited to the above example. Furthermore, the operation ratio changing pattern between the first control and the second control may be differently set, and each of the switching time periods T1 and T2 may be differently set.

Even in the second embodiment, both of the mechanical correction and the electronic correction can be used, and the feeling of awkwardness in a case of switching between the mechanical correction and the electronic correction can be reduced. In addition, the amount of power consumption can be further suppressed, compared to a case of performing the same switching control between the first control and the second control.

Third Embodiment

Figure 11:
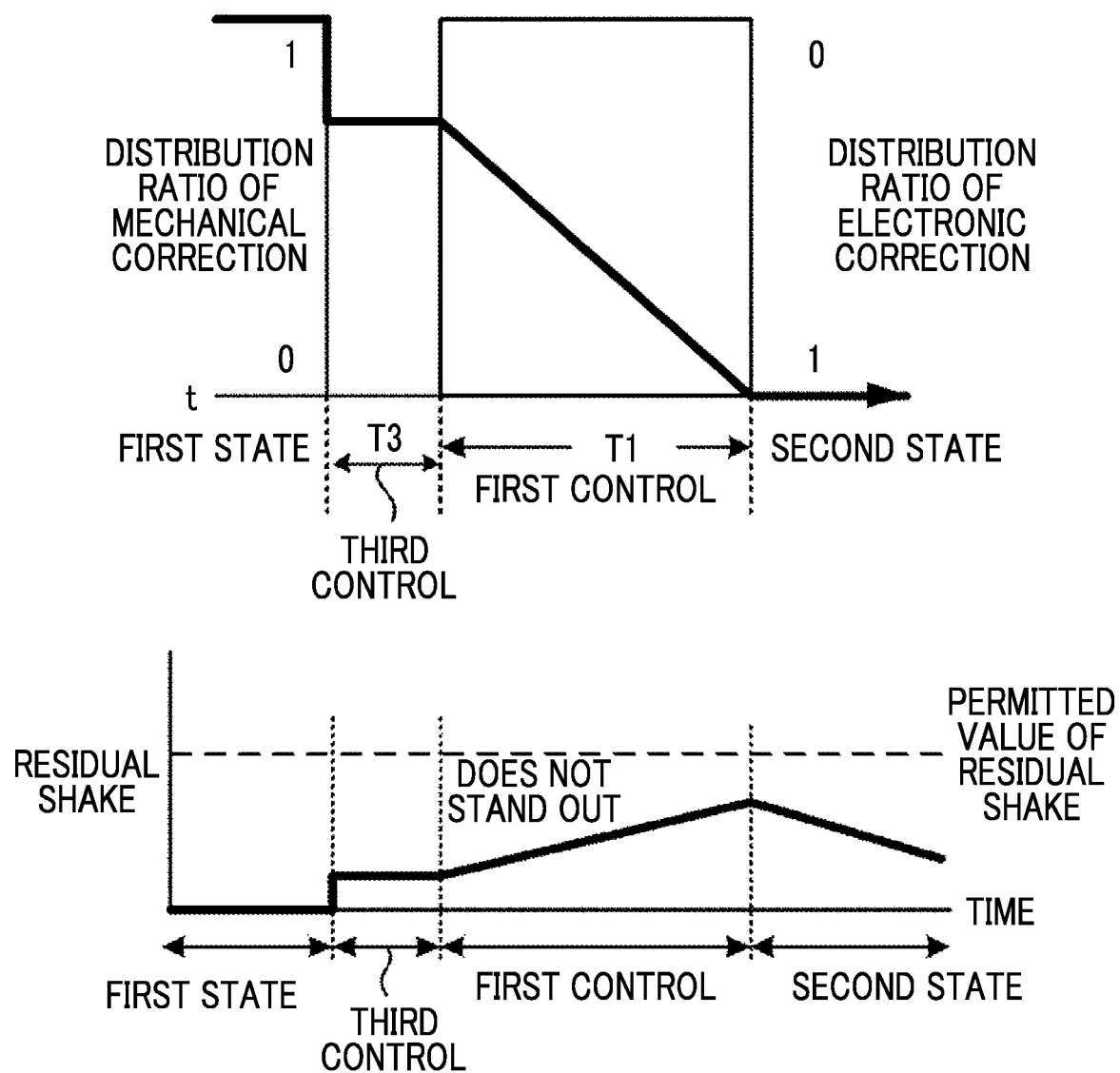
FIG. 11 is an example of a pattern of changing an operation ratio between mechanical correction and electronic correction of a first control according to a third embodiment.

Hereinafter, a third embodiment will be described with reference to the drawings. In the third embodiment, a third control is performed before the start of the first control in a case of transitioning from the first state to the second state. Specifically, as illustrated in an upper drawing of FIG. 11 as an example, the third control for performing only the mechanical correction at a ratio of greater than 0 and less than 1 for the correction amount is executed before performing the first control. In the third control, the correction amount of the shake correction by the mechanical correction unit 24 is controlled to be less than the correction amount necessary for the shake correction. As illustrated in a lower diagram of FIG. 11, by intentionally increasing the residual shake until the start of the first control subsequent to the third control, the feeling of awkwardness due to an increase in residual shake in the first control can be further reduced. It is preferable that which degree of increase in residual shake and which degree of continuation of a time period T3 after which switching is performed to the first control can further reduce the feeling of awkwardness are decided in advance by testing. While a length of the control time period T3 of the third control is not particularly limited, for example, the control time period T3 may be a time period less than the length of T1.

An example of third control addition processing in the third embodiment will be described. Imaging processing of the third embodiment is the same as imaging processing of the first embodiment illustrated in FIG. 4. Accordingly, here, only step S17 in FIG. 4 will be described using FIG. 12.

Figure 12:
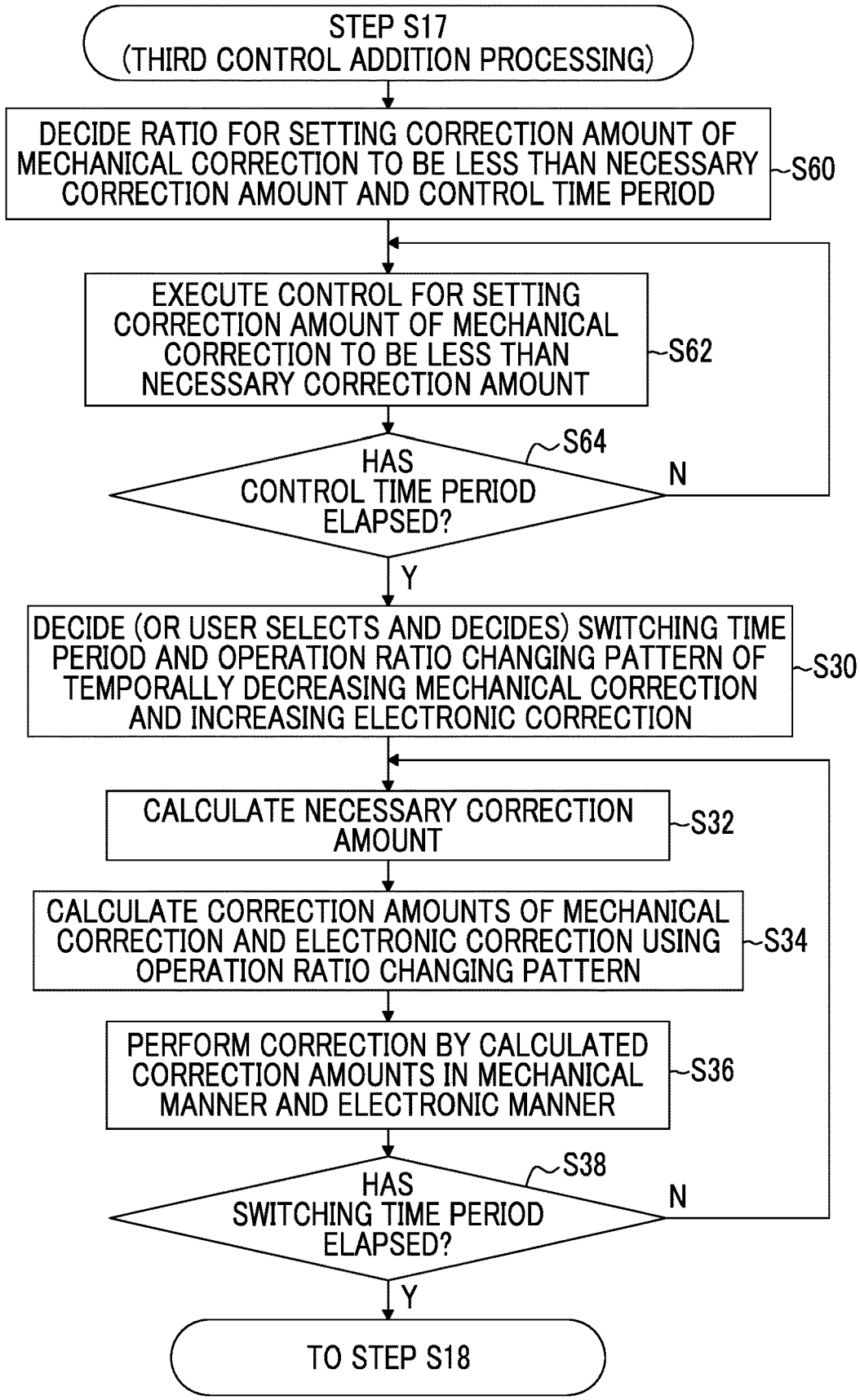
FIG. 12 is a flowchart of third control addition processing according to the third embodiment.

In step S60 in FIG. 12, the shake correction control unit 63 decides a ratio for setting the correction amount of the mechanical correction to be less than the necessary correction amount, and the control time period T3 for controlling at the radio. Next, in step S62, the shake correction control unit 63 executes the third control for setting the correction amount of the mechanical correction to be less than the necessary correction amount. In step S64, the shake correction control unit 63 determines whether or not the control time period T3 decided in step S62 has elapsed. In step S64, in a case where the control time period T3 has not elapsed, a negative determination is made, and a return is made to step S62. In a case where the control time period T3 has elapsed, a positive determination is made, and a transition is made to step S30.

Step S30 to step S38 are the same as step S30 to step S38 illustrated in FIG. 6 in the first embodiment, and thus, will not be described. In a case where a positive determination is made in step S38, a transition is made to step S18 in FIG. 4.

The third control may always be executed before the first control. In addition, the user may be able to set whether or not to execute the third control. The time period of the first control in the third embodiment is set to be longer than the time period of the second control. Alternatively, the time period of the first control and the time period of the second control may be set to be the same, and each control pattern may be differently set. For example, a method of differently setting the control pattern is the same as a method described in FIG. 10A and FIG. 10B. In the third embodiment, the feeling of awkwardness due to an increase in shake in a case of switching from the mechanical correction to the electronic correction can be further reduced.

Fourth Embodiment

Next, a fourth embodiment will be described. The fourth embodiment is an embodiment of rewriting the switching time period T1 of the first control depending on whether or not a predetermined target is imaged in a case of changing from the mechanical shake correction to the electronic shake correction. In the fourth embodiment, for example, the monitoring camera 10 comprises a detection unit that detects whether or not the predetermined target is imaged by image analysis. In the fourth embodiment, the CPU 37 operates as the detection unit. However, the technology of the present disclosure is not limited thereto. A processor separate from the CPU 37 may be operated as the detection unit, or the CPU 37 and at least one another processor may be operated in cooperation as the detection unit. Detection of the target by the image analysis in the detection unit can use a well-known technology, and thus, will not be described here. In the first control, in a case where the detection unit does not detect the predetermined target, the shake correction control unit 63 sets the length of the time period of the first control to be shorter than in a case where the detection unit detects the predetermined target.

Figure 13:
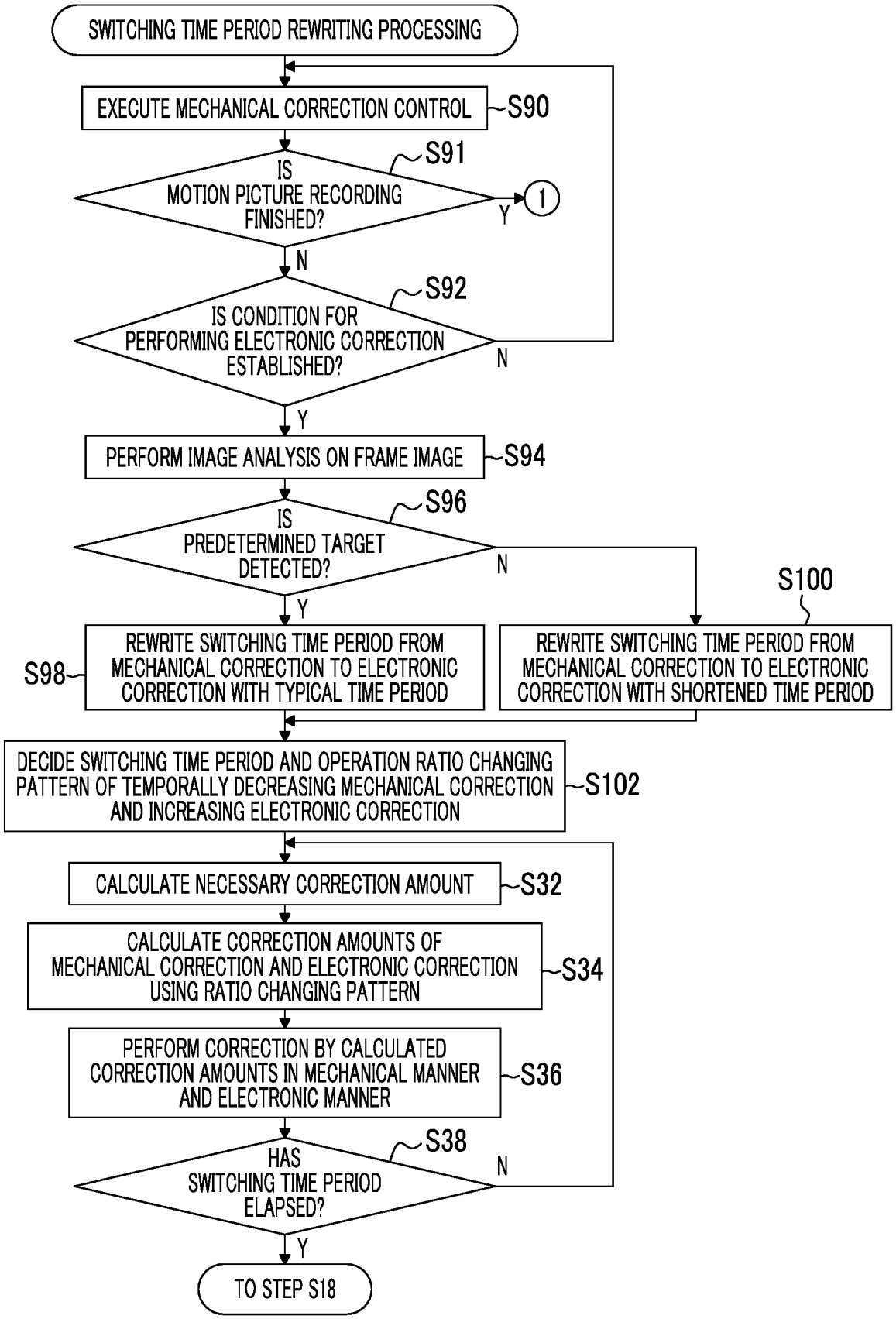
FIG. 13 is a flowchart of switching time period rewriting processing according to a fourth embodiment.

Hereinafter, switching time period rewriting processing will be described using FIG. 13 as an example. Imaging processing in the fourth embodiment is the same as the imaging processing of the first embodiment illustrated in FIG. 4. Accordingly, here, description will be provided from step S90 corresponding to step S14 in FIG. 4. In step S90, the mechanical shake correction control is executed. In step S91, the shake correction control unit 63 determines whether or not the condition for finishing the motion picture recording is established. The condition for finishing the motion picture recording is the same as described in step S15 in FIG. 4. In a case where a positive determination is made in step S91, a return is made to step S11 in FIG. 4.

In a case where a negative determination is made in step S91, a transition is made to step S92. In step S92, the shake correction control unit 63 determines whether or not a condition for transitioning to the electronic shake correction control is established. The condition for transitioning to the electronic shake correction control is the same as described in step S16 in FIG. 4. In step S92, in a case where the condition for transitioning to the electronic shake correction control is not established, a negative determination is made, and a return is made to step S90. Meanwhile, in a case where the condition for transitioning to the electronic shake correction control is established, a positive determination is made, and a transition is made to step S94.

In step S94, the shake correction control unit 63 causes the detection unit to perform image analysis processing on a currently obtained frame image. The image analysis processing is performed for determining whether or not the predetermined target is present in the frame image. A method of the image analysis processing performed by the detection unit can employ a well-known method.

Next, in step S96, the shake correction control unit 63 determines whether or not the predetermined target is detected in the frame image. In step S96, in a case where the predetermined target is detected in the frame image, a positive determination is made, and a transition is made to step S98. In step S98, the shake correction control unit 63 rewrites the switching time period T1 of the first control for switching from the mechanical shake correction control to the electronic shake correction control, with a predetermined normal time period T1A. Next, a transition is made to step S102. The shake correction control unit 63 decides the operation ratio changing pattern of temporally decreasing the mechanical correction and increasing the electronic correction.

Meanwhile, in step S96, in a case where the predetermined target is not detected in the frame image, a negative determination is made, and a transition is made to step S100. In step S100, the shake correction control unit 63 rewrites the switching time period T1 of the first control for switching from the mechanical shake correction control to the electronic shake correction control, with a predetermined shortened time period T1B that is shorter than the normal time period T1A. Next, in step S102, the shake correction control unit 63 decides the operation ratio changing pattern of temporally decreasing the mechanical correction and increasing the electronic correction.

After step S102, a transition is made to step S32. Step S32 to step S38 are the same as step S32 to step S38 described in FIG. 6, and thus, will not be described here. In a case where a positive determination is made in step S38, a transition is made to step S18 in FIG. 4, and the electronic correction control is executed.

In the fourth embodiment, even the shortened time period T1B shorter than the normal time period T1A is preferably set to be longer than the switching time period T2 for switching from the electronic shake correction control to the mechanical shake correction control. Accordingly, it is preferable to provide a set of the normal time period T1A and a normal time period T2A satisfying T1A> T2A and a set of the shortened time period T1B and a shortened time period T2B satisfying T1B> T2B, and rewrite the switching time period T2 with the shortened time period T2B at the same time as in a case of rewriting the switching time period T1 with the shortened time period T1B. In addition, it is preferable to rewrite the switching time period T2 with the normal time period T2A at the same time as in a case of rewriting the switching time period T1 with the normal time period T1A.

The "predetermined target" that is a detection determination target in step S96 is not particularly limited. For example, in a case where a specific observation target is present, whether or not a feature such as a shape unique to the observation target is included is detected by the image analysis processing. In addition, a moving object such as a person may be used as the target. In this case, for example, whether or not an object of which a position moves compared to a background is detected by the image analysis processing by comparing a plurality of frames. In addition, an object having a specific color may be used as the target. In this case, whether or not the object having the specific color different from the background is present in the image is detected by the image analysis processing.

According to the fourth embodiment, in a case where the predetermined target is not imaged, switching is performed in a short time period from the mechanical shake correction control to the electronic shake correction control. Thus, a time period in which the mechanical correction unit 24 is used can be further shortened. According to the fourth embodiment, in a case where the predetermined target is imaged, the feeling of awkwardness due to shake correction switching can be reduced. In a case where the predetermined target is not imaged, suppression of the power consumption can be prioritized.

In the fourth embodiment, the switching time period of the first control or the second control is rewritten depending on whether the predetermined target is imaged or not imaged. However, the condition is not limited thereto. For example, in a case where the shake is large, the switching time period of the first control or the second control may be rewritten with a large value.

First Modification Example

In the first embodiment to the fourth embodiment, a method of correcting the shake by moving the correction optical system 19 is used as a method of the mechanical correction. However, the method of the mechanical correction is not limited thereto. For example, a method of correcting the shake by moving the imaging element 25 can be used as the method of the mechanical correction. In this case, a position sensor detecting a position of the imaging element 25 and an imaging element driving unit moving the imaging element 25 are disposed in the monitoring camera 10. The ROM 35 stores, instead of the mechanical correction control program 144, an imaging element movement control program for calculating a movement destination of the imaging element 25 and moving the imaging element 25 to the movement destination using the shake information acquired from the shake detection sensor 40. The switching control program 146 is a program for controlling the mechanical correction of moving the imaging element 25 and the electronic correction of electronically correcting the shake. The shake correction control unit 63 executes the mechanical correction and the electronic correction in accordance with the decided operation ratio changing pattern.

In addition, a combination type of the method of moving the correction optical system 19 and the method of moving the imaging element 25 may be used as the method of the mechanical correction. In a case of this type, a ratio for distributing a movement amount of the correction optical system 19 and a movement amount of the imaging element 25 can be set in advance. Alternatively, a distribution ratio of both of the movement amounts may be decided in accordance with a predetermined condition.

Even in a first modification example, the same effect as the first embodiment can be obtained. The first modification example can be applied to the first embodiment to the fourth embodiment.

Second Modification Example

In the first embodiment, a method of obtaining the displacement direction and the displacement amount of the same target between two consecutive frames, cutting out an image at a position of movement in the direction by the displacement amount, and displaying the image is used as a method of the electronic correction. However, the method of the electronic correction is not limited thereto. For example, the electronic correction can be executed using the shake information obtained by the shake detection sensor 40.

Specifically, the shake correction control unit 63 calculates a shake amount that is obtained by combining the shake information obtained from imaging of the preceding frame to imaging of the succeeding frame out of the two consecutive frames by the shake detection sensor 40. Next, the shake correction control unit 63 acquires a displacement amount after the correction optical system 19 is moved at a correction amount distribution ratio decided by the switching control program 146 until imaging of the succeeding frame. Next, the shake correction control unit 63 subtracts the displacement amount of movement of the correction optical system 19 from the shake amount obtained by combining the shake information obtained by the shake detection sensor 40, cuts out an image at a movement destination of the difference, and displays the image. Even in a second modification example, the same effect as the first embodiment can be obtained. The second modification example can be applied to the first embodiment to the fourth embodiment.

Third Modification Example

In a case where a predetermined condition is established, switching may be performed from the shake correction by the mechanical correction unit 24 to the shake correction by the electronic correction unit 33 without synchronizing the shake correction operations. That is, in a case where the predetermined condition is established, the switching time period T1 of the first control may be changed to zero. By changing the switching time period T1 of the first control to zero, a usage time period of the mechanical correction unit 24 can be further reduced.

For example, the condition for changing the switching time period T1 of the first control to zero is a case where the shake is less than or equal to a predetermined defined value. Alternatively, for example, it is possible that a time range in which vibrations are decreased is predicted in advance, and that being in a specific time range is the condition for changing the switching time period T1 to zero. In a case where the vibrations are small, the residual shake is not increased even in a case of immediately switching from the mechanical shake correction to the electronic shake correction. Thus, the feeling of awkwardness is not significant.

In addition, for example, in a case where the shake is less than or equal to the predetermined defined value, the switching time period T1 of the first control may be changed to zero, and the switching time period T2 of the second control may be changed to zero. In a case where the shake is less than or equal to the predetermined defined value, the residual shake is small even in a case where the switching time period T1 and the switching time period T2 are changed to zero. Thus, the feeling of awkwardness is not significant.

An example of applying the shake correction control device according to the embodiments of the technology of the present disclosure to the monitoring camera 10 is described in the first embodiment to the fourth embodiment. However, an application target of the shake correction control device according to the embodiments of the technology of the present disclosure is not limited thereto. For example, the shake correction control device according to the embodiments of the technology of the present disclosure can be applied to an interchangeable-lens digital camera.

In this case, for example, a control program of the mechanical correction unit moving a correction lens as an interchangeable lens is stored in a control unit disposed in a camera main body unit. The control unit controls the electronic correction unit and the mechanical correction unit. By this configuration, both of the electronic correction unit and the mechanical correction unit can be controlled by mounting the interchangeable lens on the camera main body unit. In addition, in a case of using the mechanical correction unit moving the imaging element, the electronic correction unit and the mechanical correction unit can be controlled by the control unit which is disposed in the camera main body unit and controls the electronic correction unit and the mechanical correction unit.

The imaging processing, the first control, the second control, the third control, and the switching time period rewriting processing (hereinafter, these types of processing will be referred to as "various types of processing") described in each of the embodiments are merely an example. Accordingly, unnecessary steps may be deleted, new steps may be added, or a processing order may be rearranged without departing from a gist of the present disclosure.

Figure 14:
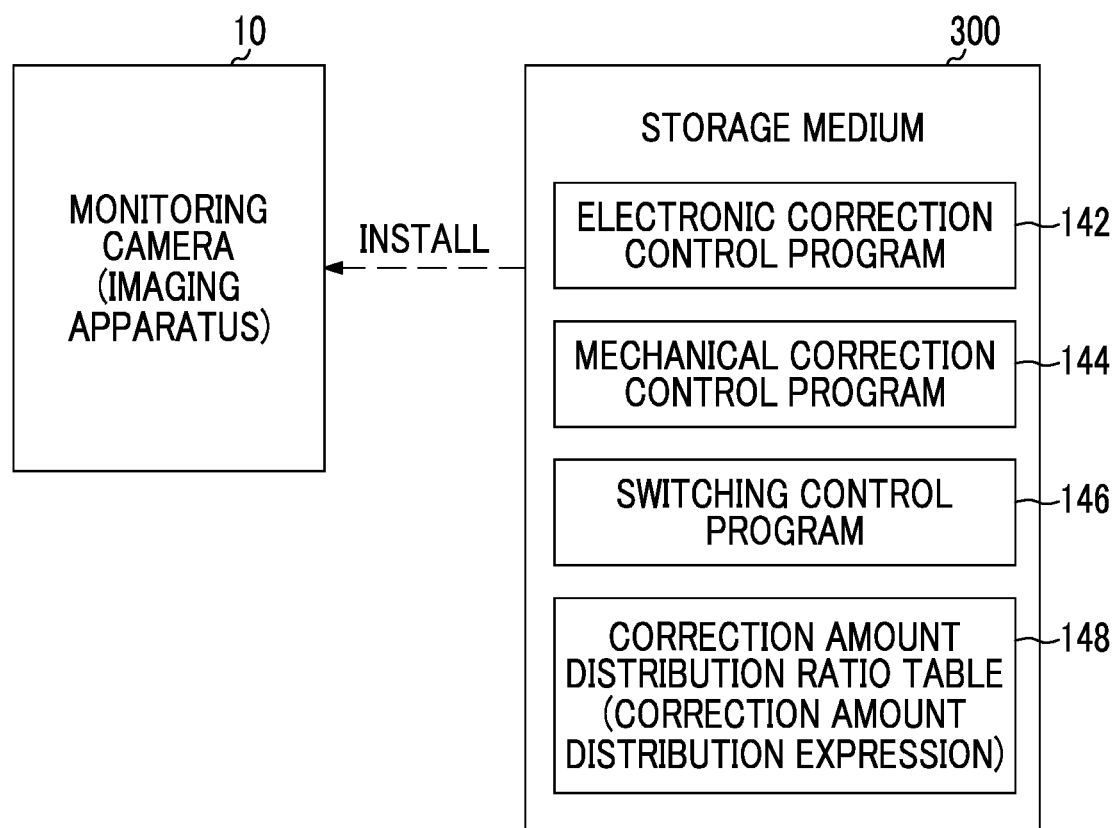
FIG. 14 is a conceptual diagram of installation of a program and the like on the monitoring camera from a portable storage medium.

While a case of storing the electronic correction control program 142, the mechanical correction control program 144, the switching control program 146, and the operation ratio table 148 (these programs will be referred to as the "electronic correction control program and the like") in the ROM 35 and reading out from the ROM 35 is illustrated in each of the embodiments, it is not necessary to store the electronic correction control program and the like in the ROM 35 from the beginning. For example, as illustrated in FIG. 14, the electronic correction control program and the like may be stored in a storage medium 300 of any portable type such as an SSD, a USB memory, or a CD-ROM. In this case, the electronic correction control program and the like stored in the storage medium 300 are installed on the ROM 35 of the monitoring camera 10, and the installed electronic correction control program and the like are executed by the shake correction control unit 63.

The electronic correction control program and the like may be stored in a storage unit of another computer, a server apparatus, or the like connected to the monitoring camera 10 through a communication network (not illustrated), and the electronic correction control program and the like may be downloaded in response to a request of the CPU 37. In this case, the downloaded electronic correction control program and the like are executed by the shake correction control unit 63.

In the embodiments, for example, various processors illustrated below can be used as a hardware structure of the CPU 37. The various processors include, in addition to the CPU that is a general-purpose processor functioning (functioning as a hardware resource executing the various types of processing) as each control unit by executing software (program) as described above, a PLD such as an FPGA that is a processor having a circuit configuration changeable after manufacturing, and/or a dedicated electric circuit such as an ASIC that is a processor having a circuit configuration dedicatedly designed to execute a specific type of processing, and the like. A memory is incorporated in or connected to any processor, and any processor executes the various types of processing using the memory.

The CPU 37 may be configured with one of the various processors or may be configured with a combination of two or more processors of the same type or different types (for example, a combination of a plurality of FPGAs or a combination of the CPU and the FPGA). In addition, a plurality of control units (hardware resources for executing the various types of processing) may be in one processor.

As an example of configuring the plurality of control units with one processor, first, as represented by a computer such as a client and a server, a form in which one processor is configured with a combination of one or more CPUs and software, and in which this processor functions as the plurality of control units (hardware resources for executing the various types of processing) is available. Second, as represented by a system on a chip (SoC) or the like, a form of using a processor that implements, by one IC chip, a function of the entire system including the plurality of control units (hardware resources for executing the various types of processing) is available. Accordingly, the control units (hardware resources for executing the various types of processing) can be configured using one or more of the various processors as the hardware structure.

Furthermore, as a hardware structure of those various processors, more specifically, an electric circuit in which circuit elements such as semiconductor elements are combined can be used.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. A shake correction control device comprising:
a processor; and
a memory that is connected to or incorporated in the processor, the processor being configured to:
acquire imaging information for selecting mechanical correction for mechanically performing shake correction of a subject image or electronic correction for electronically performing shake correction of the subject image,
perform a first control for performing a switching control from the mechanical correction to the electronic correction and synchronizing shake correction operations of the mechanical correction, and the electronic correction and a second control for performing a switching control from the electronic correction to the mechanical correction, based on the acquired imaging information,
perform different controls for each of the first control and the second control, and
decrease a first operation ratio in accordance with passage of time and increase a second operation ratio in accordance with passage of time from a start to an end of the first control, the first operation ratio being a ratio of a shake correction amount of the mechanical correction to a correction amount necessary for the shake correction, and the second operation ratio being a ratio of a shake correction amount of the electronic correction to a correction amount necessary for the shake correction.

2. The shake correction control device according to claim 1, wherein the processor is configured to, in the second control, increase the first operation ratio in accordance with passage of time and decrease the second operation ratio in accordance with passage of time by synchronizing the shake correction operations of the mechanical correction and the electronic correction, from a start to an end of the second control.

3. The shake correction control device according to claim 1, wherein the processor is configured to, in the second control, perform the switching control from the electronic correction to the mechanical correction without synchronizing the shake correction operations.

4. The shake correction control device according to claim 1, wherein a length of a time period of the first control is variable.

5. The shake correction control device according to claim 1, wherein the mechanical correction is performed by moving a correction optical system.

6. An imaging apparatus comprising the shake correction control device according to claim 1.

7. The imaging apparatus according to claim 6, wherein the imaging apparatus is a monitoring camera.

8. A shake correction control device, comprising:
a processor; and
a memory that is connected to or incorporated in the processor, the processor being configured to:
acquire imaging information for selecting mechanical correction for mechanically performing shake correction of a subject image or electronic correction for electronically performing shake correction of the subject image,
perform a first control for performing a switching control from the mechanical correction to the electronic correction and synchronizing shake correction operations of the mechanical correction and the electronic correction, and a second control for performing a switching control from the electronic correction to the mechanical correction, based on the acquired imaging information, and
perform control having different time responsiveness for the first control and the second control, respectively.

9. The shake correction control device according to claim 8, wherein the processor is configured to perform a control for setting a different length of time period for the first control and the second control, respectively.

10. The shake correction control device according to claim 9, wherein the processor is configured to set a longer length for the time period of the first control than for the time period of the second control.

11. The shake correction control device according to claim 8, wherein a length of a time period of the first control is variable.

12. The shake correction control device according to claim 8, wherein the mechanical correction is performed by moving a correction optical system.

13. A shake correction control device comprising:
a processor; and
a memory that is connected to or incorporated in the processor, the processor being configured to:
acquire imaging information for selecting mechanical correction for mechanically performing shake correction of a subject image or electronic correction for electronically performing shake correction of the subject image,
perform a first control for performing a switching control from the mechanical correction to the electronic correction and synchronizing shake correction operations of the mechanical correction and the electronic correction, and a second control for performing a switching control from the electronic correction to the mechanical correction, based on the acquired imaging information,
perform different controls for each of the first control and the second control, and before a start of the first control, perform a third control for setting a correction amount of the mechanical correction lower than a correction amount necessary for the shake correction.

14. The shake correction control device according to claim 13, wherein a length of a time period of the first control is variable.

15. The shake correction control device according to claim 13, wherein the mechanical correction is performed by moving a correction optical system.

16. A shake correction control device, comprising:
a processor; and
a memory that is connected to or incorporated in the processor, the processor being configured to:
  acquire imaging information for selecting mechanical correction for mechanically performing shake correction of a subject image or electronic correction for electronically performing the shake correction of the subject image,
  perform a first control for performing a switching control from the mechanical correction to the electronic correction and synchronizing shake correction operations of the mechanical correction and the electronic correction, and a second control for performing a switching control from the electronic correction to the mechanical correction, based on the acquired imaging information,
  detect a predetermined target, and
in the first control, set a shorter length for a time period of the first control in a case of not detecting the target than in a case of detecting the target.

17. The shake correction control device according to claim 16, wherein the mechanical correction is performed by moving a correction optical system.

18. A shake correction control device, comprising:
a processor; and
a memory that is connected to or incorporated in the processor, the processor being configured to:
  acquire imaging information for selecting mechanical correction for mechanically performing shake correction of a subject image or electronic correction for electronically performing the shake correction of the subject image,
  perform a first control for performing a switching control from the mechanical correction to the electronic correction and synchronizing shake correction operations of the mechanical correction and the electronic correction and a second control for performing a switching control from the electronic correction to the mechanical correction, based on the acquired imaging information, and
  in a case in which a predetermined condition is established, perform a control for switching from the mechanical correction to the electronic correction, and for switching from the electronic correction to the mechanical correction, without synchronizing the shake correction operations.

19. The shake correction control device according to claim 18, wherein the mechanical correction is performed by moving a correction optical system.

* * * * *

UNITED STATES PATENT AND TRADEMARK OFFICE
CERTIFICATE OF CORRECTION

| | |
|---|---|
| PATENT NO. | : 11,228,711 B2 |
| APPLICATION NO. | : 17/329193 |
| DATED | : January 18, 2022 |
| INVENTOR(S) | : Masuda et al. |

It is certified that error appears in the above-identified patent and that said Letters Patent is hereby corrected as shown below:

On the Title Page

Item (30) Foreign Application Priority Data --Nov. 29, 2018 (JP) ......JP2018-224227-- should be shown.

Signed and Sealed this
Seventh Day of June, 2022

Katherine Kelly Vidal
*Director of the United States Patent and Trademark Office*